United States Patent
Takamori et al.

(10) Patent No.: US 7,212,311 B2
(45) Date of Patent: May 1, 2007

(54) IMAGE PROCESSING CONDITION SETTING APPARATUS AND IMAGE PROCESSING CONDITION SETTING PROGRAM STORAGE MEDIUM

(75) Inventors: Tetsuya Takamori, Kanagawa (JP); Yukihisa Ozaki, Kanagawa (JP)

(73) Assignee: FujiFilm Corporation, Tokyo (JP)

( * ) Notice: Subject to any disclaimer, the term of this patent is extended or adjusted under 35 U.S.C. 154(b) by 759 days.

(21) Appl. No.: 09/749,657

(22) Filed: Dec. 28, 2000

(65) Prior Publication Data
US 2001/0006425 A1 Jul. 5, 2001

(30) Foreign Application Priority Data
Dec. 28, 1999 (JP) ................. 11-372854

(51) Int. Cl.
H04N 1/00 (2006.01)
(52) U.S. Cl. ........................ 358/1.9; 358/406
(58) Field of Classification Search ............... 358/1.9, 358/504, 406, 2.1, 3.21–3.23, 3.05
See application file for complete search history.

(56) References Cited

U.S. PATENT DOCUMENTS

| | | | | |
|---|---|---|---|---|
| 5,333,069 A | * | 7/1994 | Spence | 358/517 |
| 5,510,896 A | * | 4/1996 | Wafler | 358/296 |
| 5,694,227 A | * | 12/1997 | Starkweather | 358/504 |
| 5,999,650 A | * | 12/1999 | Ligon | 382/191 |
| 6,016,207 A | * | 1/2000 | Wield | 358/406 |
| 6,473,199 B1 | * | 10/2002 | Gilman et al. | 358/1.9 |
| 6,510,241 B1 | * | 1/2003 | Vaillant et al. | 382/154 |
| 6,704,123 B1 | * | 3/2004 | Av-Shalom et al. | 358/2.99 |

FOREIGN PATENT DOCUMENTS

| | | |
|---|---|---|
| JP | 6-291998 | 10/1994 |
| JP | 9-121290 | 5/1997 |

OTHER PUBLICATIONS

Patent Abstract of Japan 09-121290, May 6, 1997.
Patent Abstract of Japan 06-291998, Oct. 18, 1994.

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

There is disclosed an image processing condition setting apparatus for determining an image processing condition defining contents of an image processing to set up the image processing condition to an image processing apparatus for executing the image processing in accordance with the determined image processing condition. The image processing condition setting apparatus has an image obtaining section for obtaining an image according to an original image to be subjected to an image processing in said image processing apparatus, an initial image processing condition determination section for determining an initial image processing condition in accordance with the image obtained by said image obtaining section, an image processing condition determination section for determining in accordance with an operation an image processing condition having a desired deviation from the initial image processing condition determined by said initial image processing condition determination section, and an image processing condition setting section for setting up the image processing condition determined by said image processing condition determination section to said image processing apparatus.

25 Claims, 14 Drawing Sheets

IMAGE PROCESSING CONDITION SETTING APPARATUS AND IMAGE PROCESSING CONDITION SETTING PROGRAM STORAGE MEDIUM

BACKGROUND OF THE INVENTION

1. Field of the Invention

The present invention relates to an image processing condition setting apparatus for setting an image processing condition representative of contents of an image processing, which is used in an image processing apparatus for applying an image processing to an image obtained, and an image processing condition setting program storage medium storing an image processing condition setting program which causes a computer system to operate as the image processing condition setting apparatus when the image processing condition setting program is executed by the computer system.

2. Description of the Related Art

Hitherto, it is widely performed that a printed matter is produced by a printing machine in accordance with an original image obtained through reading a document image by a scanner for example. In a producing process of the printed matter, in order to obtain a good finished image for the original image, usually, an image processing is applied to the original image. The image processing is performed in accordance with a predetermined image processing condition (condition representative of contents of the image processing). When the image processing condition is suitably set, an operator can apply a desired image processing to the original image.

This image processing condition includes, for example, factors representative of curvatures of a highlight curve, a half tone curve and a shadow curve, which represent a transformation relation between density of an image before the image processing and density of an image after the image processing.

In a producing process of the printed matter, as an apparatus for setting such an image processing condition, there is used an image processing condition setting apparatus. As such an image processing condition setting apparatus, there is known an apparatus in which an original image is analyzed, and an image processing condition, which is considered as the optimal one for the original image, is automatically computed and set up in accordance with the analyzed result.

For example, such an image processing condition setting apparatus produces a density profile representative of a density distribution of an image from an image before the processing, and automatically computes a value which is considered to be the optimum one of the factor representative of the curvature of the highlight curve.

However, it happens that a tendency of the image processing is out of an operator's intention, for example, in such a way that an image, which is obtained through the image processing based on the image processing condition automatically computed and set up in the manner as mentioned above, is always slightly dark, or always different from the operator's wish in choice of greens. Thus, there is a requirement to adjust a discrepancy of such a tendency of the image processing.

It is possible to adjust the discrepancy of the tendency of the image processing by rewriting the program for computing the image processing condition. However, in many cases, there is a need to repeat over and over trial and error as to whether the image processing condition computed by the rewritten program meets the image processing intended by the operator. This takes a lot of time and labor.

On the other hand, in the event that the image processing condition is manually controlled and set up, without performing such an automatic computation of the image processing condition, it is possible to obtain a desired image. However, in this case, it is necessary to manually adjust one by one factors representative of curvatures of the highlight curve and the like. This needs skills of a technique of setting of the image processing condition. It is difficult for a general operator to suitably perform setting of the image processing condition.

SUMMARY OF THE INVENTION

In view of the foregoing, it is an object of the present invention to provide an image processing condition setting apparatus capable of simply setting up a desired image processing condition for a general operator, and an image processing condition setting program storage medium storing an image processing condition setting program which causes a computer system to operate as the image processing condition setting apparatus when the image processing condition setting program is executed by the computer system.

To achieve the above-mentioned object, the present invention provides an image processing condition setting apparatus for determining an image processing condition defining contents of an image processing to set up the image processing condition to an image processing apparatus for executing the image processing in accordance with the determined image processing condition, said image processing condition setting apparatus comprising:

an image obtaining section for obtaining an image according to an original image to be subjected to an image processing in said image processing apparatus;

an initial image processing condition determination section for determining an initial image processing condition in accordance with the image obtained by said image obtaining section;

an image processing condition determination section for determining in accordance with an operation an image processing condition having a desired deviation from the initial image processing condition determined by said initial image processing condition determination section; and an image processing condition setting section for setting up the image processing condition determined by said image processing condition determination section to said image processing apparatus.

Hitherto, there is known an image processing condition setting apparatus for automatically producing the initial image processing condition. However, according to the image processing based on the initial image processing condition automatically produced by such an image processing condition setting apparatus, it often happens that there is a discrepancy between the initial image processing condition and an image processing condition which brings about a desired image processing for an operator, for an example, such that always slightly dark images are produced. To the contrary, according to the image processing condition setting apparatus of the present invention, the image processing condition having a desired deviation from the initial image processing condition is determined in accordance with an operation from an operator. Thus the operator can simply set up the image processing condition bringing about a desired image processing for the operator by adjusting the deviation of the image processing condition from the initial image processing condition in accordance with the operation.

In the image processing condition setting apparatus according to the present invention as mentioned above, it is preferable that the image processing condition setting apparatus further comprises an association defining section defining an association between parameter values of a first parameter in which values applied to points on a predetermined path in a parameter space defined by a plurality of sorts of second parameters defining a deviation from the initial image processing condition, of the image processing condition, are given as parameter values, and combinations of parameter values of said plurality of sorts of second parameters corresponding to the points on the predetermined path, wherein said image processing condition determination section is designated by the parameter values of the first parameter in accordance with an operation, and determines, referring to the association defined by said association defining section, the image processing condition having the deviation consisting of the combinations of parameter values of said plurality of sorts of second parameters, associated with the designated parameter values.

With respect to the first parameter referred to in the above, the parameter values correspond to the combinations of the parameter values of the plurality of sorts of second parameters. Thus, an alteration of the associated combination may freely make various definitions of the first parameter. Hence, the adjustment of the combinations associated with the parameter values of the first parameter makes it easy to define parameters representative of the concept representing a visual sense of a person, such as brightness, redness, hardness, etc., into parameters excellent in quality offering an image variation which is sensuously natural.

According to the image processing condition setting apparatus, the decision of the image processing condition is performed in accordance with the designation of parameter values of parameters which are sensuously natural, and thus the general operator can perform sensuously naturally the designation of the parameters, and whereby the operator easily performs the decision of a desired image processing condition.

In the image processing condition setting apparatus as mentioned above, it is acceptable that said association defining section is a storage section for storing a table in which the association is described.

In the image processing condition setting apparatus as mentioned above, it is acceptable that said association defining section is a storage section for storing a functional formula of parameter values of the second parameter wherein parameter values of the first parameter are given in form of argument.

In the image processing condition setting apparatus according to the present invention as mentioned above, it is preferable that the image processing condition setting apparatus further comprises a first storage section for storing a deviation of the image processing condition determined by said image processing condition determination section from the initial image processing condition determined by said initial image processing condition determination section.

Storage of the deviation of the thus determined image processing condition makes it for example to use the present deviation as a deviation of the default in the subsequent image processing. Thus, it is possible to save the procedure for decision of the image processing condition.

In the image processing condition setting apparatus according to the present invention as mentioned above, it is acceptable that the image processing condition setting apparatus further comprises a second storage section for storing parameter values of the first parameter representative of a deviation of the image processing condition determined by said image processing condition determination section from the initial image processing condition determined by said initial image processing condition determination section.

In the image processing condition setting apparatus according to the present invention as mentioned above, it is preferable that the image processing condition setting apparatus further comprises a display section for displaying a handler for a deviation adjustment from the initial image processing condition determined by said initial image processing condition determination section, wherein said image processing condition determination section recognizes a desired deviation upon receipt of an operation of the displayed handler and determines the image processing condition having a desired deviation from the initial image processing condition.

According to the image processing condition setting apparatus as mentioned above, it is possible to easily adjust the image processing condition.

In the image processing condition setting apparatus according to the present invention as mentioned above, it is preferable that said image processing condition determination section produces a plurality of images by a plurality of image processing based on the image processing condition having deviations mutually different on the image processing conditions for the initial image processing condition determined by said initial image processing condition, and determines the image processing condition of the desired image upon receipt of designation of a desired image of the plurality of images, in accordance with an operation.

In this manner, in the event that a plurality of images associated with the mutually different deviations are produced, an operator comparatively scrutinizes those images, and thus it is possible to easily perform the decision of the image processing condition.

In the image processing condition setting apparatus according to the present invention as mentioned above it is preferable that said association defining section defines the association on a plurality of sorts of first parameter for a plurality of paths mutually different in the parameter space, said image processing condition setting apparatus further comprises a parameter selection section for selecting at a time a sort of first parameter from among the plurality of sorts of first parameter in accordance with an operation, and said image processing condition determination section produces a plurality of images subjected to an image processing based on the image processing condition for the parameter values of the first parameter selected by said parameter selection section, for the initial image processing condition determined by said initial image processing condition, and determines the image processing condition of the desired image upon receipt of designation of a desired image of the plurality of images, in accordance with an operation.

Further, it is preferable that said association defining section defines the association on a plurality of sorts of first parameter for a plurality of paths mutually different in the parameter space, said image processing condition setting apparatus further comprises a parameter selection section for selecting simultaneously two sorts of first parameter from among the plurality of sorts of first parameter in accordance with an operation, and said image processing condition determination section produces a plurality of images subjected to an image processing based on the image processing condition for sets of the parameter values of the two sorts of first parameters selected by said parameter selection section, for the initial image processing condition determined by said initial image processing condition, and determines the image processing condition of the desired image upon receipt of designation of a desired image of the plurality of images, in accordance with an operation.

According to the image processing condition setting apparatus as mentioned above, an operator can select various first parameters, and thereby producing various images associated with the parameter values of the first parameter selected on the display section. Thus, the operator can easily set up a desired image processing condition by selecting a desired image from among the various images.

In the image processing condition setting apparatus as mentioned above, it is preferable that said image processing condition setting apparatus further comprises a display section for displaying the plurality of images produced by said image processing condition determination section on a two-dimensional basis in accordance with the parameter values of the two sorts of first parameters.

This feature makes it easy for an operator to set up the image processing condition, since the operator can easily grasp the state of changes of the images as to the parameter.

Further, in the event that the plurality of images are displayed on a two-dimensional basis in accordance with the parameter values of the two sorts of first parameters, it is possible to display much various images as images of a comparative object as compared with a case where a plurality of images, which vary in accordance with a parameter value of a single parameter, and thereby making it easy to set up the image processing condition.

In the image processing condition setting apparatus according to the present invention as mentioned above, it is preferable that said image processing condition setting apparatus further comprises:

an image processing section for performing an image processing for the image obtained by said image obtaining section in accordance with the initial image processing condition determined by said the initial image processing condition determination section;

a display section for displaying a handler for a deviation adjustment from the initial image processing condition determined by said initial image processing condition determination section and an image subjected to the image processing by said image processing section, and an indication section for indicating a microscopic area on the image displayed on said display section in accordance an operation, wherein said image processing condition determination section recognizes a desired deviation as to the microscopic area on the image indicated by said indication section in accordance with an operation of said handler and determines the image processing condition in which the desired deviation is reflected on the microscopic area.

According to the image processing condition setting apparatus, said image processing condition determination section recognizes a desired deviation as to the microscopic area on the image indicated by said indication section in accordance with an operation of said handler and determines the image processing condition in which the desired deviation is reflected on the microscopic area. This feature makes it possible to easily set up the image processing condition for altering the state of the microscopic area to a desired state.

To achieve the above-mentioned object, the present invention provides an image processing condition setting program storage medium storing an image processing condition setting program, wherein when the image processing condition setting program is executed by a computer system, said computer system serves as an image processing condition setting apparatus for determining an image processing condition defining contents of an image processing to set up the image processing condition to an image processing apparatus for executing the image processing in accordance with the determined image processing condition, said image processing condition setting program comprising:

an image obtaining section for obtaining an image according to an original image to be subjected to an image processing in said image processing apparatus;

an initial image processing condition determination section for determining an initial image processing condition in accordance with the image obtained by said image obtaining section;

an image processing condition determination section for determining in accordance with an operation an image processing condition having a desired deviation from the initial image processing condition determined by said initial image processing condition determination section; and an image processing condition setting section for setting up the image processing condition determined by said image processing condition determination section to said image processing apparatus.

In the event that the image processing condition setting program is executed by the computer system, the computer system, which serves as the above-mentioned image processing condition setting apparatus, brings about the same operational effect as the image processing condition setting apparatus of the present invention.

While the same names for the structural elements are applied between the image processing condition setting apparatus and the image processing condition setting program, those structural elements mean both the hardware and the software in the image processing condition setting apparatus, and mean only the software in the image processing condition setting program.

DETAILED DESCRIPTION OF PREFERRED EMBODIMENTS

Embodiments of the present invention will be described with reference to the accompanying drawings.

Figure 1:
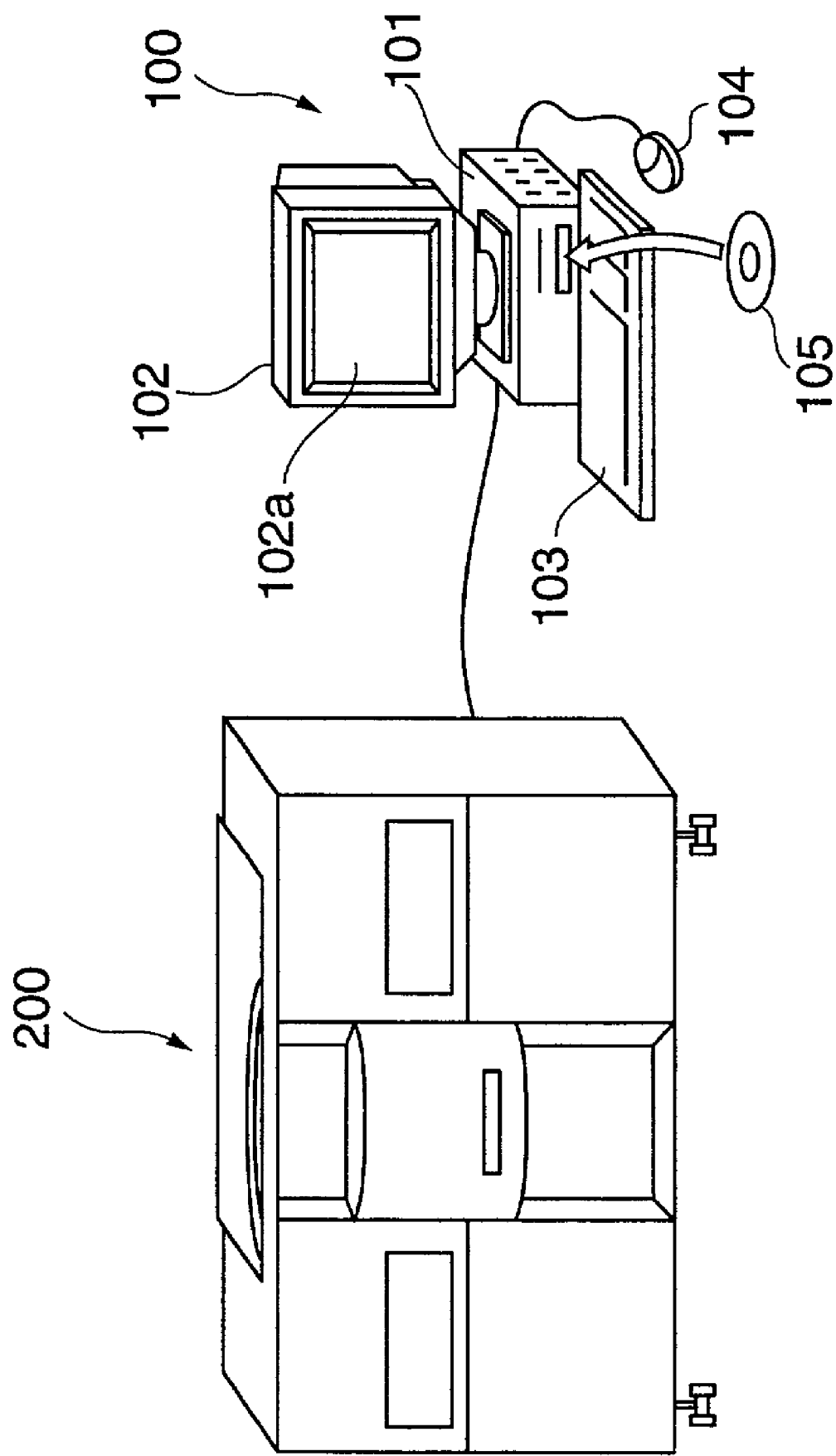
FIG. 1 is a view of an image processing system to which an image processing condition setting apparatus according to a one embodiment of the present invention is applied.

FIG. 1 is a view of an image processing system to which an image processing condition setting apparatus according to a one embodiment of the present invention is applied.

The image processing system shown in FIG. 1 comprises a computer system 100 for performing an image processing for an original image, and a scanner 200 for reading a predetermined document image to produce original images representative of color images of CMY colors according to the document image.

Figure 2:
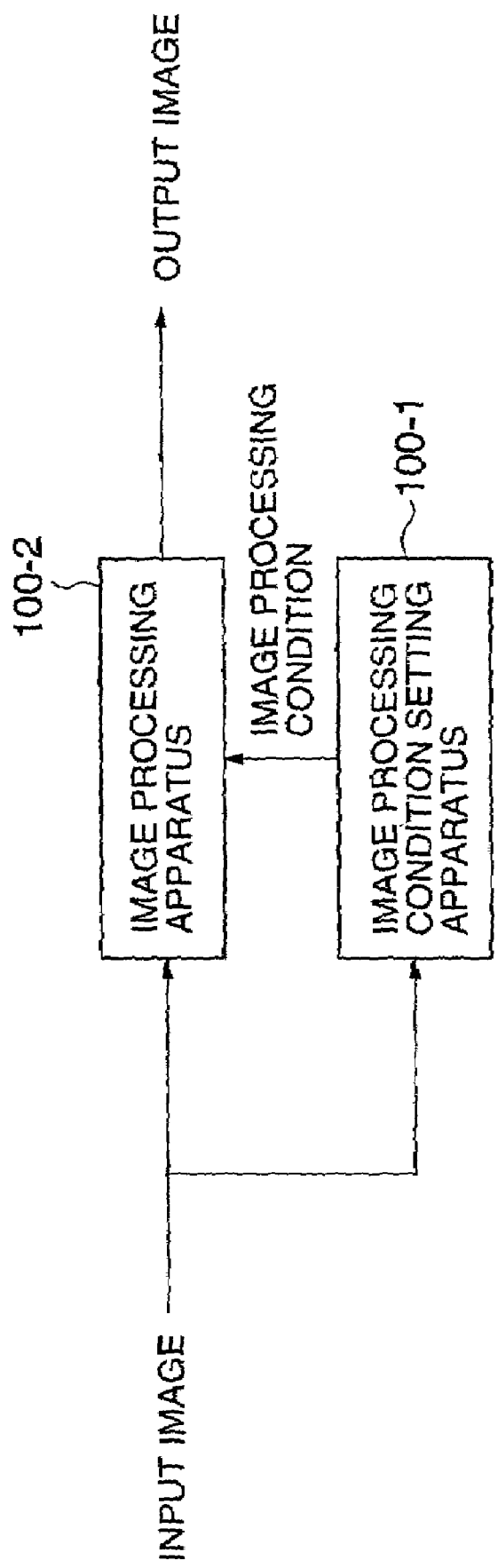
FIG. 2 is a schematic construction view of a computer system.

FIG. 2 is a schematic construction view of a computer system.

In FIG. 2, a computer system 100 comprises an image processing condition setting apparatus 100_1 and an image processing apparatus 100_2.

As mentioned above, the original image produced by the scanner 200 is fed to the image processing condition setting apparatus 100_1 and the image processing apparatus 100_2 of the computer system 100. The image processing apparatus 100_2 applies an image processing to the original image so that the original image becomes a better finished image. This image processing is performed in accordance with the image processing condition indicating the contents of the image processing.

This image processing condition is automatically computed by the image processing condition setting apparatus 100_1 in accordance with a result of the analysis for the inputted original image by a predetermined program. The image processing condition thus obtained through the analysis is an image processing condition which is determined by the algorithm of the program as the optimum for the inputted original image. However, in many cases, it happens that the image, which is subjected to the image processing in accordance with the image processing condition thus determined, is different from one associated with an operator's intention, for example, it is slightly dark, or different from the operator's wish in choice of greens. On the other hand, the image processing condition setting apparatus 100_1 has a function of performing an adjustment of the image processing condition, which is hitherto performed through the modification of the factory and the like, in accordance with an operation of a general operator in which the image processing condition is set up. This function makes it possible to set up the image processing condition which brings about the image processing satisfying the operator's wish.

According to the present embodiment, the image processing condition is represented, in a similar fashion to that set up by the conventional image processing condition setting apparatus, by a combination of parameter values of a plurality of basic parameters defining a highlight curve, a half tone curve, a shadow curve, a boost a color correction, a sharpness, etc. In other words, the image processing condition is represented by a point in a basic parameter space defined by the plurality of basic parameters. As examples of these basic parameters, there are raised factors each representative of a curvature of a highlight curve of each of CMYK colors on a graph in which a horizontal axis represents an input of an image and a vertical axis represents an output of an image, and density of the input image associated with the highlight point of each of the highlight curves. Those basic parameters correspond to the first parameter referred to in the present invention.

It is difficult for a general operator to skillfully adjust the image processing condition represented by the basic parameters. On the other hand, according to the image processing condition setting apparatus 100_1 of the present embodiment, function parameters such as brightness, redness and hardness, which are able to be sensuously perceived by an operator, are introduced with a suitable definition as will be described later. The function parameter corresponds to a path within a basic parameter space in which a point associated with the initial image processing condition is given as the original point. Values applied to points on the paths are referred to as parameter values. Consequently, a plurality of sorts of function parameters correspond to a plurality of paths within the basic parameter space, respectively. The function parameters correspond to the second parameter referred to in the present invention. An adoption of the function parameters makes it possible for a general operator to easily perform a set up of a new image processing condition adjusted through an operation of a mouse, so that a desired image for the operator is produced in accordance with the new image processing condition.

Hereinafter, there will be described in detail the structure and the operation of the computer system 100 on which the image processing condition setting apparatus 100_1 having the above-mentioned function is implemented.

The computer system 100 comprises: a main frame section 101 incorporated therein a CPU, a main storage unit, a hard disk, a communication board, etc.; a CRT display 102 for performing a display for pictures and characters on a display screen 102a in accordance with an instruction from the main frame section 101; a keyboard 103 for entering user's instructions and character information into the computer system 100; and a mouse 104 for designating an arbitrary position on the display screen 102a to enter an instruction according to an icon or the like displayed on the position at the time of the designation.

A CD-ROM 105 is detachably loaded on the main frame section 101. The main frame section 101 incorporates therein a CD-ROM drive for reproducing information stored in the CD-ROM 105 thus loaded. Further, an MO 106 (not illustrated in FIG. 1) is detachably loaded on the main frame section 101. The main frame section 101 incorporates therein an MO drive for recording and reproducing information to the MO 106 thus loaded.

A hardware construction of the computer system 100 is as follows.

Figure 3:
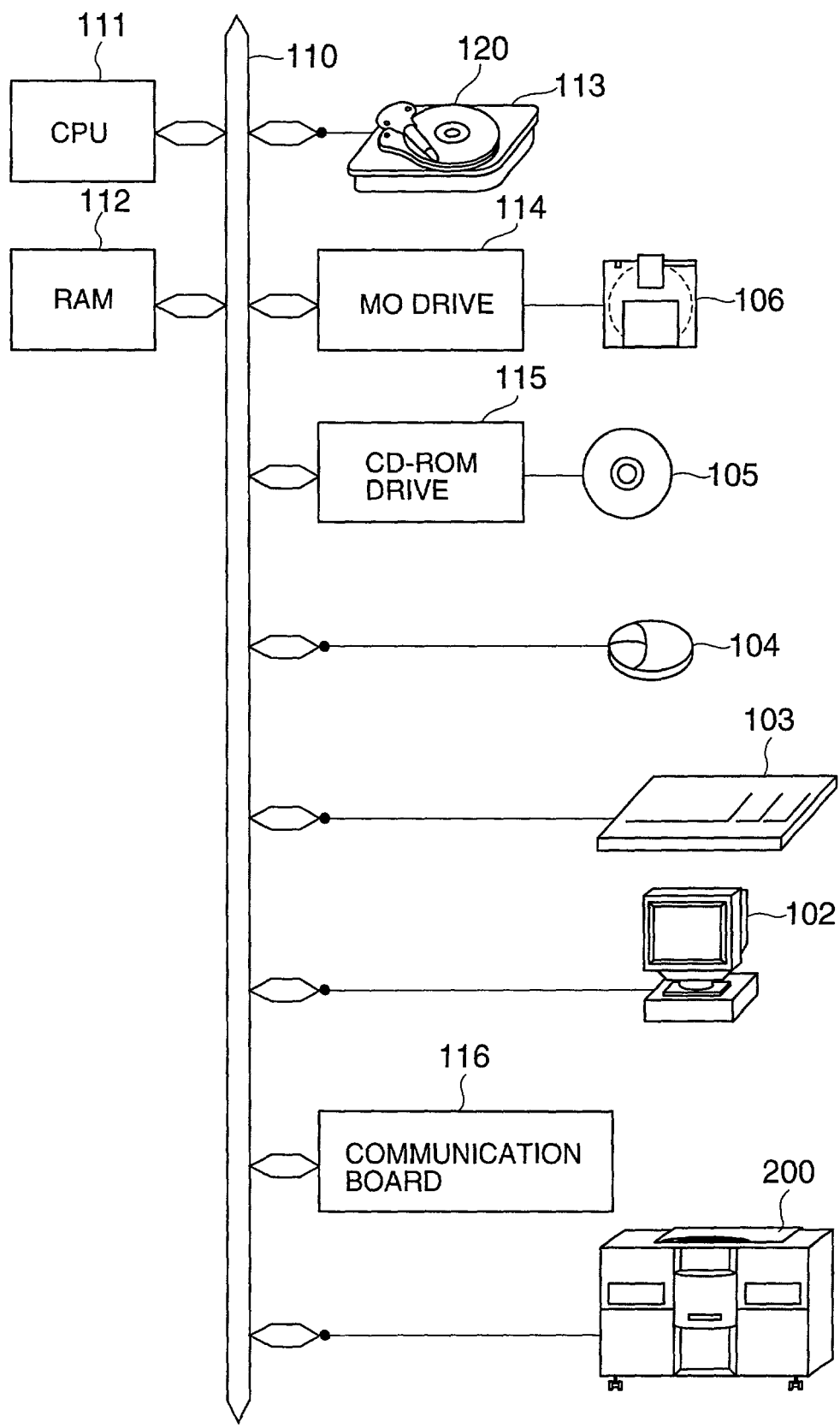
FIG. 3 is a hardware construction view of a computer system.

FIG. 3 is a hardware construction view of a computer system.

The computer system comprises a CPU (central processing unit) 111, a RAM 112, a HDD (hard disk drive) 113, an MO drive 114, a CD-ROM drive 115, and a communication board 116. Those are mutually connected to one another via a bus 110. The HDD 113 incorporates therein a hard disk 120 as a recording medium, and performs recording and reproducing of information on the hard disk 120.

The computer system further comprises a mouse 104, a keyboard 103, a CRT display 102, and a scanner 200, which are connected to the bus 110 via a plurality of interfaces (not illustrated).

Figure 4:
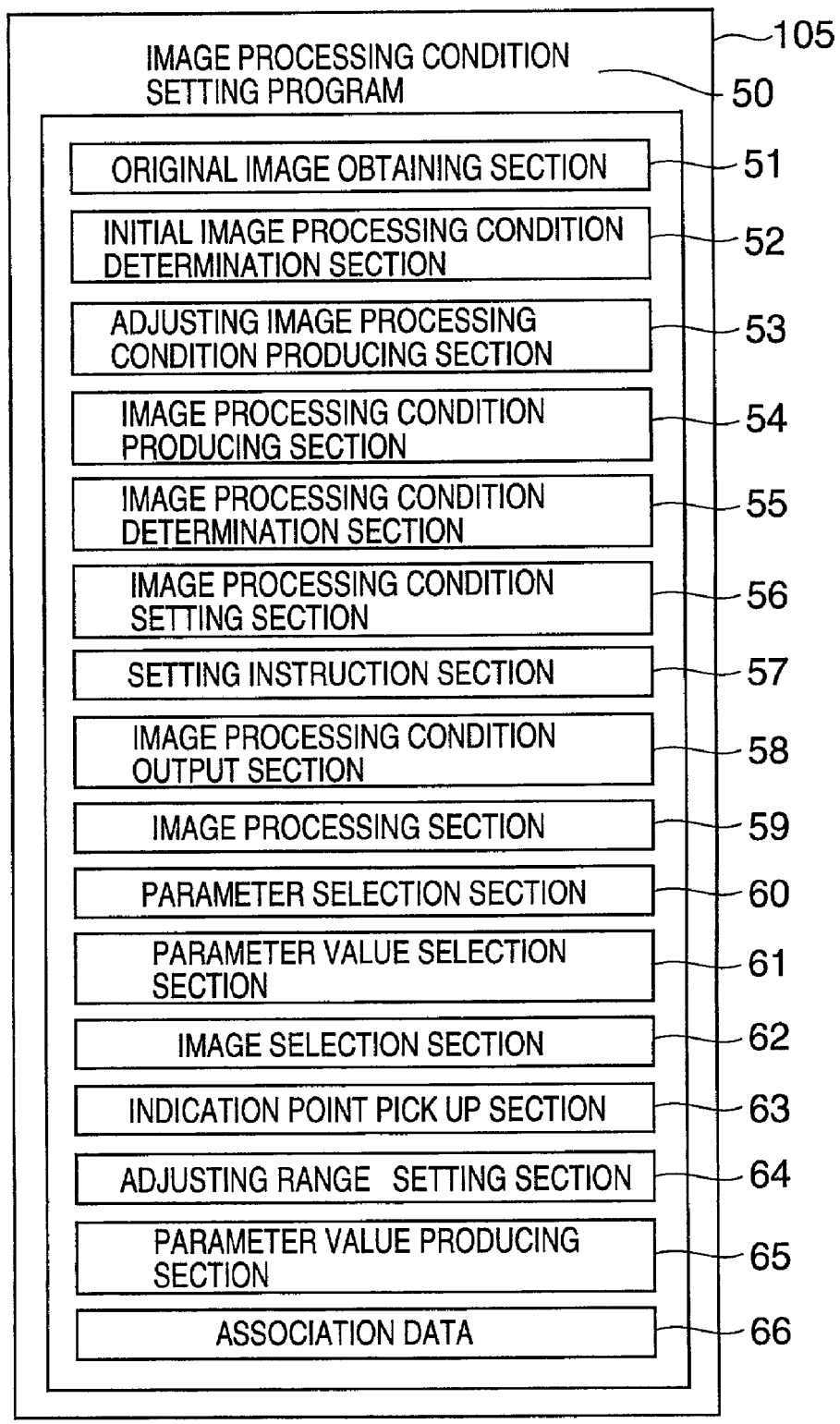
FIG. 4 is a view of an image processing condition setting program storage medium according to a one embodiment of the present invention.

FIG. 4 is a view of an image processing condition setting program storage medium according to a one embodiment of the present invention.

According to the present embodiment, the CD-ROM 105 stores therein the image processing condition setting program referred to in the present invention. The CD-ROM 105 storing the image processing condition setting program corresponds to one embodiment of the image processing condition setting program storage medium of the present invention.

An image processing condition setting program 50 stored in the CD-ROM 105 shown in FIG. 4 includes, as a software, an original image obtaining section 51, an initial image processing condition determination section 52, an adjusting image processing condition producing section 53, an image processing condition producing section 54, an image processing condition determination section 55, an image processing condition setting section 56, a setting instruction section 57, an image processing condition output section 58, an image processing section 59, a parameter selection section 60, a parameter value selection section 61, an image selection section 62, an indication point pick up section 63, an adjusting range setting section 64, a parameter value producing section 65, and an association data 66. According to the present embodiment, a portion corresponding to the image processing condition determination section of the image processing condition setting program storage medium of the present invention comprises the adjusting image processing condition producing section 53, the image processing condition producing section 54, and the image processing condition determination section 55.

The CD-ROM 105 is loaded onto the main frame 101 so that the image processing condition setting program 50 stored in the CD-ROM 105 is read by the CD-ROM drive 115 and is installed via the bus 110 in the hard disk 120.

When the image processing condition setting program 50 installed in the hard disk 120 is activated, the image processing condition setting program 50 installed in the hard disk 120 is loaded on the RAM 112 and executed by the CPU 111. That is, on the computer system 100, the image processing condition setting apparatus 100_1, which comprises a software and a hardware as an environment for operating the software, is implemented with the structure shown in FIG. 5. The structural elements constituting the image processing condition setting apparatus 100_1 shown in FIG. 5 correspond to the same parts denoted by the same names as those of the software. The association data 66 is stored in the hard disk 120.

Incidentally, the image processing condition setting program 50 stored in the CD-ROM 105 is installed in the hard disk of the computer system 100 in the manner as mentioned above. In this case, the hard disk in which the image processing condition setting program is installed also corresponds to a one embodiment of the image processing condition setting program storage medium of the present invention.

In the computer system 100 shown in FIG. 1, as the program storage medium for storing the image processing condition setting program, the CD-ROM 105 is used. It is noted, however, that the program storage medium referred to in the present invention is not restricted to the CD-ROM, and it is acceptable to adopt a storage medium such as an optical disk, an MO, a floppy disk, a magnetic tape, etc., other than the CD-ROM. The program storage medium storing the image processing condition setting program corresponds to a one embodiment of the image processing condition setting program storage medium of the present invention.

Figure 5:
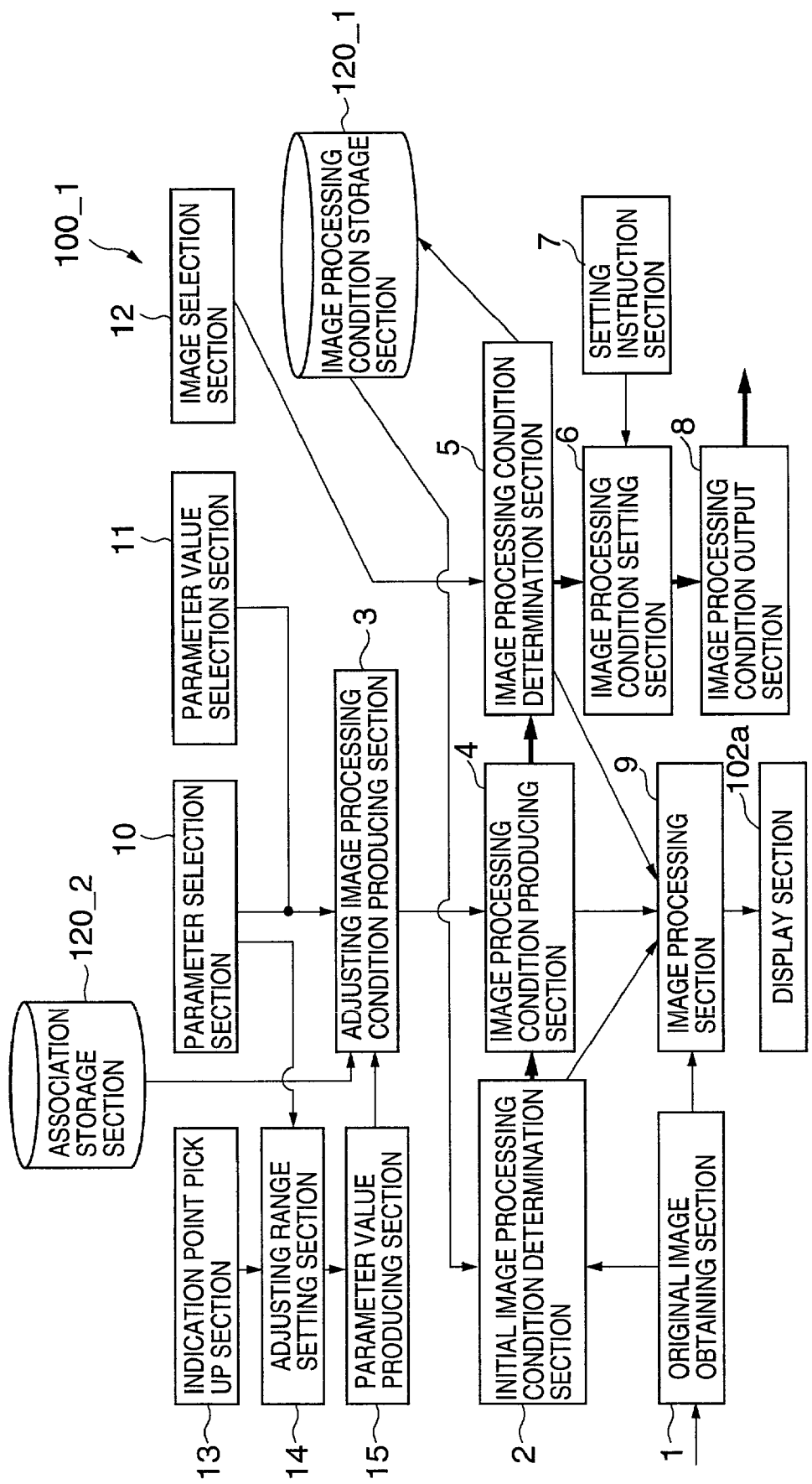
FIG. 5 is a schematic construction view of an image processing condition setting apparatus according to the present embodiment shown in FIG. 2.

FIG. 5 is a schematic construction view of an image processing condition setting apparatus according to the present embodiment shown in FIG. 2.

The image processing condition setting apparatus 100_1 implemented by the computer system 100 comprises: as shown in FIG. 5, an original image obtaining section 1 for obtaining an image involved in the original image; an initial image processing condition determination section 2 for determining a predetermined initial image processing condition in accordance with the original image obtained by the original image obtaining section 1; an association storage section 120_2 for storing the association between parameter values of function parameters and the image processing condition defined by a combination of parameter values of a plurality of basic parameters, which is represented by the association data 66; an adjusting image processing condition producing section 3 for producing at least one adjusting image processing condition representative of deviation on the image processing condition from the initial image processing condition determined by the initial image processing condition determination section 2, in accordance with the association stored in the association storage section 120_2; an image processing condition producing section 4 for producing at least one image processing condition in accordance with the initial image processing condition determined by the initial image processing condition determination section 2 and at least one adjusting image processing condition produced by the adjusting image processing condition producing section 3; an image processing condition determination section 5 for determining one image processing condition in accordance with an operation from among at least one image processing condition produced by the image processing condition producing section 4; an image processing condition storage section 120_1 for storing the image processing condition determined by the image processing condition determination section 5; an image processing condition setting section 6 for setting up in accordance with an operation the image processing condition determined by the image processing condition determination section 5; a setting instruction section 7 for transferring an instruction of setting according to the operation to the image processing condition setting section 6; an image processing condition output section 8 for outputting the image processing condition set up by the image processing condition setting section 6 to the image processing apparatus 100_2 in accordance with an operation; an image processing section 9 for performing an image processing for the original images obtained by the original image obtaining section 1; a display section 102a for displaying the image subjected to the image processing by the image processing section 9; a parameter selection section 10 for selecting function parameters; a parameter value selection section 11 for selecting at least one parameter value of the function parameters; an image selection section 12 for selecting an image in accordance with an operation of an operator from among a plurality of images displayed on the display section 102a; an indication point pick up section 13 for picking up an indication point representative of a microscopic area on an image indicated in accordance with an operation; an adjusting range setting section 14 for setting up an adjusting range of a parameter value according to a state of the indication point picked up by the indication point pick up section 13 and a sort of the function parameter selected by the parameter selection section 10 so as to adjust the state of the indication point; and a parameter value producing section 15 for producing a plurality of parameter values within the adjusted range set up by the adjusting range setting section 14.

According to the present embodiment, a portion corresponding to the image processing condition determination section of the image processing condition setting program storage medium of the present invention comprises the adjusting image processing condition producing section 3, the image processing condition producing section 4, and the image processing condition determination section 5. The indication point pick up section 13 of the present embodiment corresponds to the indication section referred to in the present invention.

The image processing condition setting apparatus 100_1 according to the present embodiment as mentioned above is used to initiate the set up of the image processing condition in accordance with an screen operation as set forth below.

Figure 6:
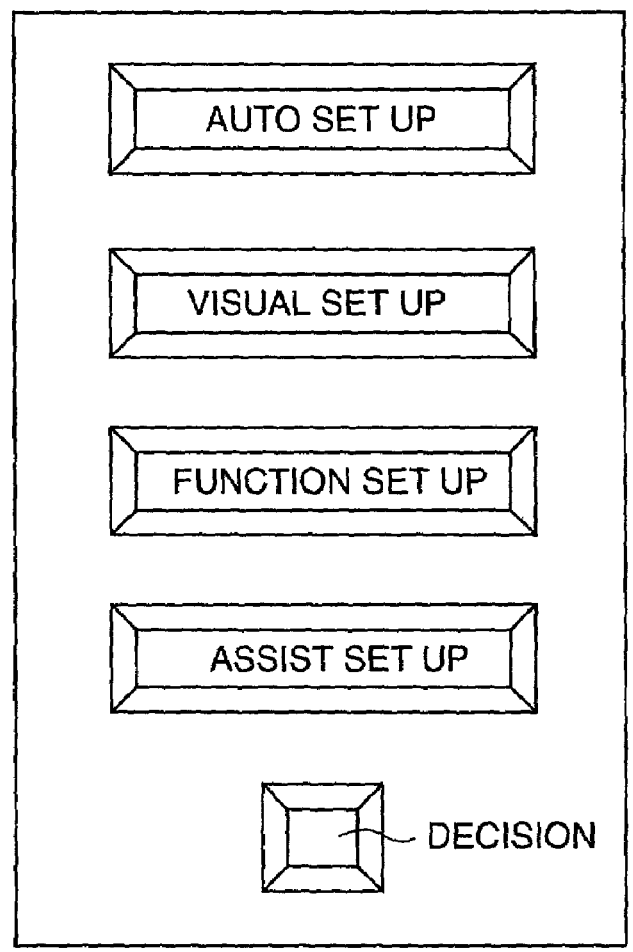
FIG. 6 is an illustration showing a set up selection screen.

FIG. 6 is an illustration showing a set up selection screen.

The set up selection screen shown in FIG. 6 is a screen appearing first in the event that the image processing condition setting apparatus according to the present embodiment is used to set up the image processing condition. On the set up selection screen, there are indicated five buttons, an "auto set up" button, a "visual set up" button, a "function set up" button, an "assist set up" button, and a "decision" button.

When the "auto set up" button on the screen is depressed in accordance with an operation of the mouse by an operator, as mentioned above, the image processing condition setting apparatus 100_1 automatically computes the initial image processing condition in accordance with only a result of the analysis of the original image entered by a predetermined program. The initial image processing condition thus computed is set up as the image processing condition for the image processing apparatus 100_2. The image processing condition thus set up is outputted to the image processing apparatus 100_2 when the "decision" button is depressed. In the "auto set up", it does not happen that the image processing condition is adjusted in accordance with an operation by an operator.

When the "visual set up" button, the "function set up" button, and the "assist set up" button, other than the "auto set up" button, are depressed, the "visual set up", the "function set up", and the "assist set up" are performed, respectively. All of those three sorts of set ups are able to be adjusted in an image processing condition having a desired deviation from the initial image processing condition in accordance with an operation by an operator. While those three sorts of set ups will be described in detail later, simply to say, the visual set up is a set up in which a plurality of images, which are subjected to the image processing on the various image processing conditions, are displayed, and an operator selects a desired image from among the displayed images to set up a desired image processing condition. The function set up is a set up in which parameter values of a plurality of function parameters are selected to set up a desired image processing condition. The assist set up is a set up in which a microscopic area is designated in accordance with an operation of an operator to set up the image processing condition so that an image is subjected to the image processing in its entirety in such a manner that a state of the designated microscopic area is changed to a desired state according to the operation. Those set ups determine an image processing condition having a desired deviation from the initial image processing condition, so that the image processing condition thus determined is set up as an image processing condition for the image processing apparatus 100_2. The image processing condition thus set up is outputted to the image processing apparatus 100_2 when the "decision" button is depressed.

<Visual Set Up>

First, there will be described operations of elements of the image processing condition setting apparatus 100_1 at the time of the visual set up, referring to an operation screen and a flowchart.

Figure 7:
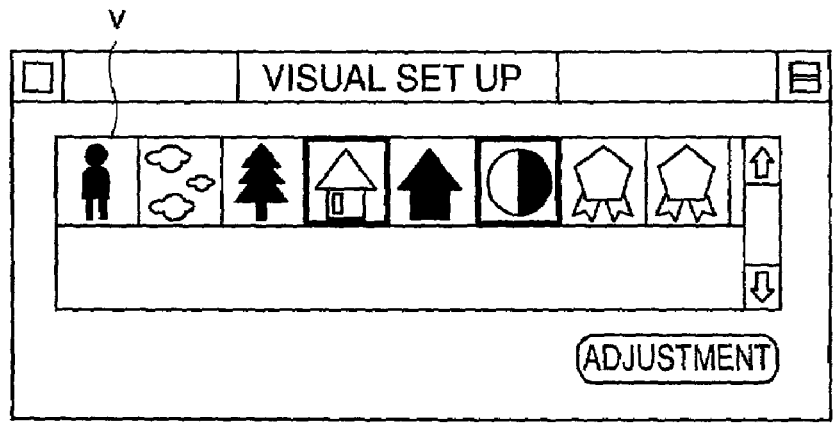
FIG. 7 is an illustration showing a visual set up dialog.

FIG. 7 is an illustration showing a visual set up dialog.

When the "visual set up" button shown in FIG. 6 is depressed, a visual set up dialog appears on a screen. On the visual set up dialog, there are displayed a plurality of icons v representative of a person, the sky, a green, light, dark, and contrast in the named order. Of those icons, the icons representative of the "light" and the "contrast" are displayed with a thick frame. A display of an icon with the thick frame indicates that the icon is selected. It is preferable that those icons are selected in accordance with the contents such as a person, the sky and a green, of the image to be subjected to the image processing. Details of the functions of those icons will be described later. While further two icons are displayed on the right side of the icon representative of the contrast, those two icons are unregistered icons stopping the function. Further, on the dialog there is displayed an "adjustment" button.

Here, by way of example, there is raised a case where an image to be subjected to the image processing is an image of a person. In this case, an operator clicks the icons displayed with thick frame to reset into a non-selection state, and then clicks the icon of the "person" to set into a state that the icon of the "person" is selected. In this condition, the "adjustment" button is depressed.

Hereinafter, there will be described a process of set up of the image processing condition by the image processing condition setting apparatus 100_1 after the depression of the "adjustment" button, referring to the flowchart of FIG. 8 and in addition FIGS. 9, 10, 11 and Table 1 as well.

Figure 8:
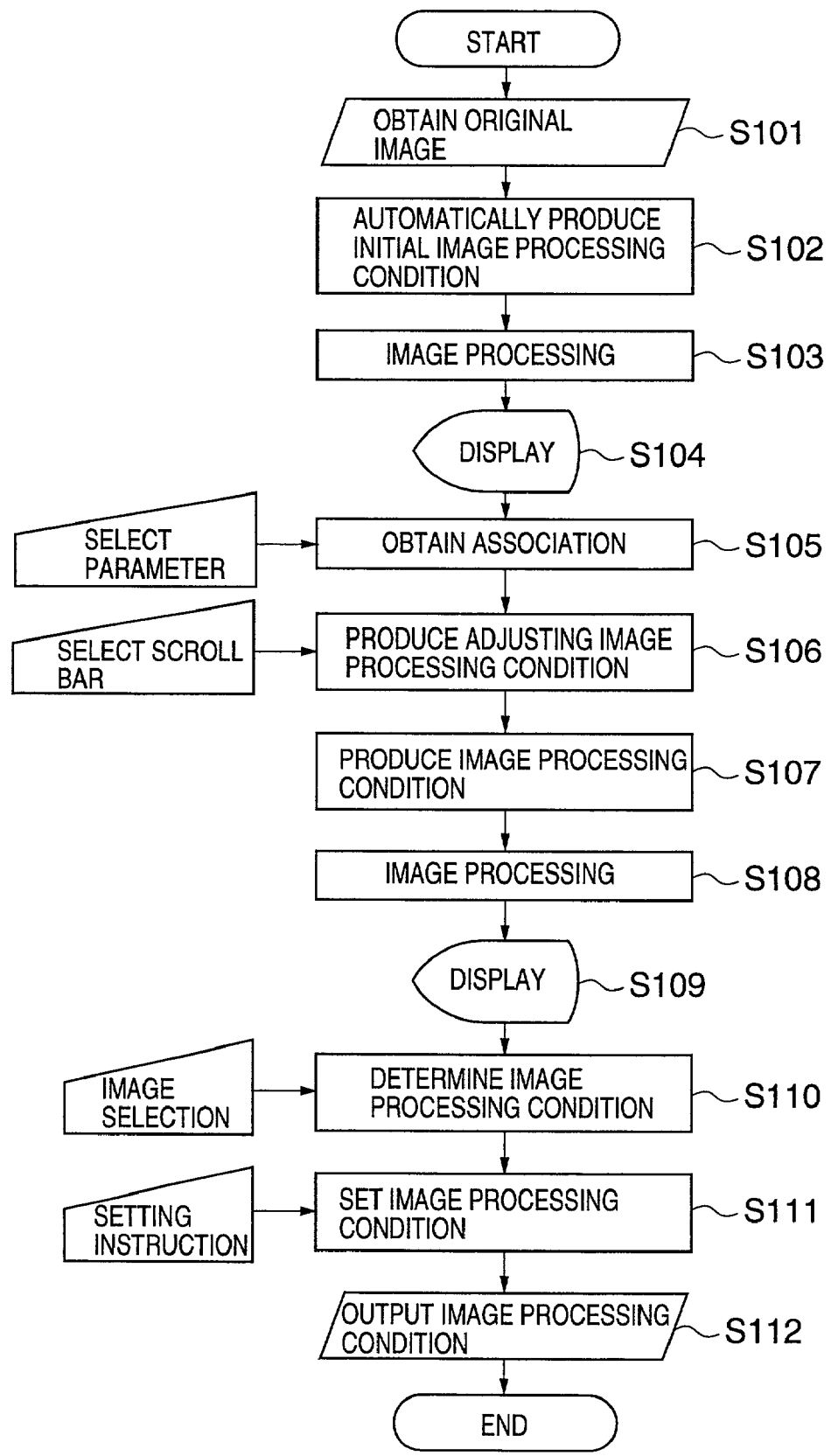
FIG. 8 is a flowchart useful for understanding an operation of the image processing condition setting apparatus according to the present embodiment at the time of a visual set up.

FIG. 8 is a flowchart useful for understanding an operation of the image processing condition setting apparatus according to the present embodiment at the time of a visual set up.

After the depression of the "adjustment" button, the process goes to a step S101.

In the step S101, the original image obtaining section 1 obtains the original image produced by the scanner 200. Then the process goes to a step S102.

In the step S102, the initial image processing condition determination section 2 performs an analysis for the original image obtained by the original image obtaining section 1, and automatically computes the image processing condition to be considered as the optimum for the original image in accordance with the analyzed result, so that the initial image processing condition, which is considered to be suitable, is determined.

A state that the "person" icon is selected in the visual set up dialog usually involves that the initial image processing condition includes a result of the adjustment performed in the past. However, for the purpose of simplification of the explanation, it is assumed that the initial image processing condition is computed in accordance with only information of the original image. Next, the process goes to steps S103 and S104.

In the steps S103 and S104, the image processing section 9 receives the initial image processing condition determined by the initial image processing condition determination section 2 and the original image obtained by the original image obtaining section 1, so that the original image is subjected to the image processing by the image processing section 9 in accordance with the initial image processing condition. The image subjected to the image processing is displayed on an image display window (not illustrated) of the display section 102a. Next, the process goes to a step S105.

Before the explanation of the step S105, there will be explained an image adjustment window displayed on the display section 102a in accordance with an operation of an operator, other than the image display window, and then there will be explained function parameters which are selectable on the image display window in a manner as will be described later.

Figure 9:
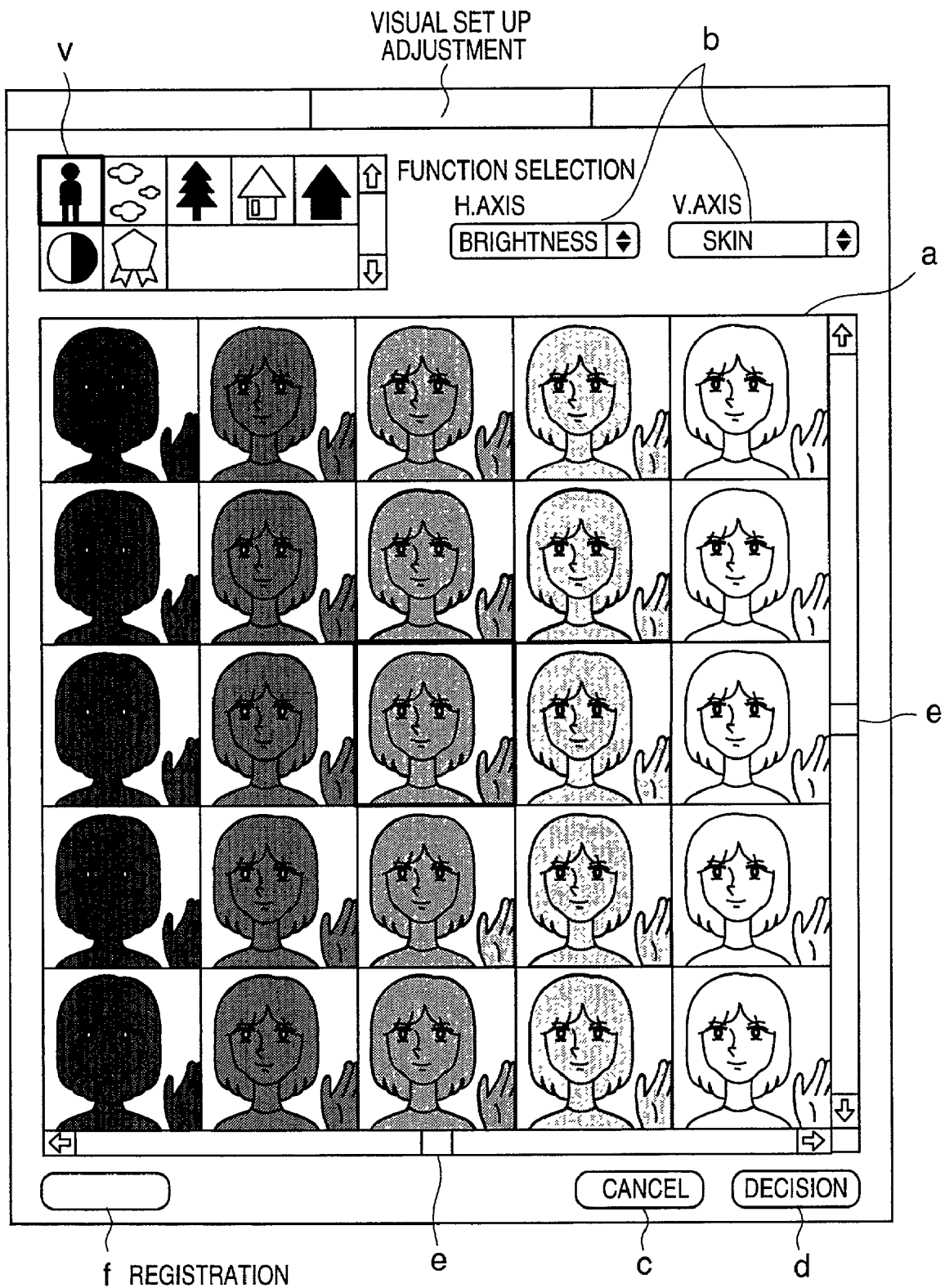
FIG. 9 is an illustration showing a screen of an image adjustment window for a visual set up.

FIG. 9 is an illustration showing a screen of an image adjustment window for a visual set up.

An operator can adjust the image processing condition, which defines the contents of the image processing for the image displayed on the image display window, using the image adjustment window shown in FIG. 9. On the image adjustment window shown in FIG. 9, 25 (5×5) ways of preview image "a" are displayed on a two-dimensional basis. On the upper left portion of the image adjustment window, a plurality of icons "v", which are the same as those shown in FIG. 7, are shown, wherein an icon "person" is selected with the thick frame indication. Further, on the upper right portion of the image adjustment window, there are shown two pop-up menus "b" for selecting function parameters. A row of the preview images in the vertical axis direction and a row of the preview images in the horizontal axis direction are involved in the function parameters, and the function parameters associated with the vertical axis and the horizontal axis are selected in accordance with an operation of an operator through the two pop-up menus "b", respectively. Further, at the bottom of the image adjustment window, there are shown a cancel button "c", a decision button "d", and a registration button "f".

An operator can select a direction of an adjustment for an image displayed on the image display window from among the function parameter groups appearing on the two pop-up menus "b" on the image adjustment window. As the function parameters included in the function parameter groups, there are raised ones as set forth below.

Brightness, a highlight point, a shadow point, redness, blueness, yellowness, greenness, a feeling of volume, a feeling of distance, a feeling of transparency, freshness, warmness, sharpness, hardness, a healthy color, pink of skin, rawness, depth of color, metallic effect.

Incidentally, sorts of the function parameters including in the function parameter groups are suitably selected beforehand in accordance with the state that the icon "v" is selected.

In these function parameters, a plurality of parameter values of the function parameters are defined by a combination of parameter values of the above-mentioned plurality of basic parameters. A Table 1 shows by way of example the association between the parameter values of the function parameters and combinations of parameter values of the basic parameters.

TABLE 1

| Parameter values | HLT set up density C, M, Y | Highlight curve C, M, Y, K | Halftone curve C, M, Y, K | Shadow curve C, M, Y, K |
|---|---|---|---|---|
| −3 | 0.2, 0.2, 0.2 | −5, −5, −5, 0 | −15, −15, −15, 0 | −1, −1, −1, 0 |
| −2 | 0.1, 0.1, 0.1 | −3, −3, −3, 0 | −12, −12, −12, 0 | −1, −1, −1, 0 |
| −1 | 0, 0, 0 | −1, −1, −1, 0 | −5, −5, −5, 0 | 0, 0, 0, 0 |
| 0 | 0, 0, 0 | 0, 0, 0, 0 | 0, 0, 0, 0 | 0, 0, 0, 0 |
| 1 | 0, 0, 0 | 1, 1, 1, 0 | 5, 5, 5, 0 | 1, 1, 1, 0 |
| 2 | 0, 0, 0 | 2, 2, 2, 0 | 8, 8, 8, 0 | 3, 3, 3, 0 |
| 3 | −0.1, −0.1, −0.1 | 3, 3, 3, 0 | 15, 15, 15, 0 | 5, 5, 5, 0 |

Table 1 shows the association between the parameter values and combinations of the parameter values of the plurality of basic parameters in the parameter values −3,−2,−1, 0, 1, 2, 3 of the function parameter "brightness". The left column of the table 1 shows the parameter values −3 to 3 of the "brightness" in the named order from the top.

In the same stage of the parameter values of the "brightness" shown in the left column of table 1, there are shown the parameter values of the basic parameters of the plurality of basic parameters defining the parameter values of the "brightness". For example, in case of −3 of the parameter value of the "brightness", the set up density associated with the respective highlight points in the highlight curves for CMY colors are given by 0.2, 0.2, 0.2; factors representative of curvatures of the highlight curves for CMYK colors are given by−5, −5, −5, 0; factors representative of curvatures of the halftone curves for CMYK colors are given by−15, −15, −15, 0; and factors representative of curvatures of the shadow curves for CMYK colors are given by−1,−1,−1, 0. That is, the parameter value −3 of the "brightness" is defined by a combination { (0.2, 0.2, 0.2), (−5, −5, −5, 0), (−15, −15, −15, 0), (−1, −1, −1, 0) } of the parameter values of the plurality of basic parameters. Hereinafter, the combination of the parameter values of the plurality of basic parameters, which defines the function parameter, is referred to as a basic parameter value set.

In case of 0 of the parameter value of the function parameter "brightness", all the parameter values of the basic parameter value set, which defines the parameter value of the function parameter, are 0. In case of 0 of the parameter value of the function parameter, not restricted to the "brightness", it means that the adjustment for the initial image processing condition is not performed with respect to the function parameter.

Incidentally, parameter values of a number of basic parameters, which are not listed on the table 1 because they are not related to the function parameter "brightness", are 0 for any parameter values of the function parameter "brightness".

In the above, while the function parameter "brightness" is explained by way of example, parameter values of various function parameters included in the above-mentioned function parameter groups are also defined by the basic parameter value sets.

Also in the conventional image processing condition setting apparatus, there is one using parameters such as the "brightness" and the "solidity". However, according to the conventional image processing condition setting apparatus, regardless of the fact that the introduced parameter is concerned with the parameter representative of the "brightness", it often happens that a plurality of images, which are subjected to the image processing in accordance with a plurality of image processing conditions varying along the parameter, are mutually different in not only brightness but also saturation, or the parameter representative of the "solidity" simply represents only the adjustment of the contrast. In this case, those parameters become parameters which represent the "brightness" and the "solidity" involving a feeling of wrongness different from brightness and solidity desired by an operator.

As mentioned above, however, the function parameters used in the present embodiment are defined by a combination of parameter values of a number of basic parameters, and an alteration of the combination makes it possible to freely define various function parameters. Thus, the adjustment of the combination of parameter values of the basic parameters for the parameter values of the function parameters makes it easy to define parameters representative of the concept representing a visual sense of a person, such as brightness, redness, hardness, etc., into parameters excellent in quality offering an image variation which is sensuously natural.

For example, with respect to the "brightness", a suitable selection of the parameter values of the basic parameters such as the highlight point set up density, and factors representative of curvatures of the highlight curve, the halftone curve and the shadow curve, which define the parameter values of the function parameter "brightness", makes it possible to suppress a change of saturation caused by a change of the "brightness". Further, with respect to the "solidity", an inclusion of one defining strength of the sharpness into the basic parameters defining the parameter values of the function parameter "solidity" makes it possible to implement a variation of the "solidity" which involves depth but not simple contrast.

The association between a plurality of parameter values of a single function parameter and the basic parameter value sets as mentioned above is stored in the association storage section 120_2. It happens that the association is stored, as shown in Table 1, in form of a table for each function parameter. Alternatively it happens that the association is stored in form of a functional formula of parameter values of the basic parameter wherein parameter values of the function parameter are given in form of argument, for example, Highlight point set up density=−0.15×a parameter value of "brightness".

While Table 1 shows the association in the parameter values of the range of −3 to 3, actually, the association in the parameter values of a broader range exceeding the range the range of −3 to 3 is defined in the table stored in the association storage section 120_2.

In the step S105, the function parameters associated with the above-mentioned horizontal axis and vertical axis are selected by the parameter selection section 10 in accordance with an operation of the pop-up menus "b" by the mouse of an operator. Here, it is assumed that the function parameters associated with the horizontal axis and vertical axis thus selected are the "brightness" and the "skin", and those function parameters are outputted to the adjusting image processing condition producing section 3.

Next, the process goes to a step S106.

In the step S106, the adjusting image processing condition producing section 3 first obtains two sorts of function parameters "brightness" and "skin" selected by the parameter selection section 10. Then, the adjusting image processing condition producing section 3 derives from the association storage section 120_2 the basic parameter value sets defining a plurality of parameter values taking 0 as the center for the obtained two sorts of function parameters "brightness" and "skin", here, five parameter values such as −2, −1, 0, 1, 2.

And the adjusting image processing condition producing section 3 produces 5×5 ways of adjusting image processing conditions according to the sets of 5×5 pieces of parameter values in combination of 5 pieces of parameter values of the "brightness" and 5 pieces of parameter values of the "skin" of the two sorts of function parameters. Each of the adjusting image processing conditions is expressed by a set of the parameter value of "brightness" and the parameter value of "skin", for example, (−2, 1), and is defined by a new basic parameter value set in which a basic parameter value set defining the parameter value "−2" of the "brightness" is added to a basic parameter value set defining the parameter value "1" of the "skin".

Here, addition of the basic parameter value sets implies that basic parameter values of all the basic parameters included in the two basic parameter value sets are gathered, and in the event that there exists a basic parameter which is included on a common basis in both the two basic parameter value set, a new basic parameter value set is produced taking a parameter value wherein two basic parameter values of the basic parameter are added one another as a new parameter value. Incidentally, with respect to the definition of the new parameter value of the common parameter, there is the voluntariness and it is acceptable that it is an averaged one but not an added one. Hereinafter, productions of new quantities defined by new basic parameter sets wherein two basic parameter sets are added to each other for quantity A and quantity B defined by two basic parameter value sets respectively are referred to as an addition of the quantity A and the quantity B.

Next, the process goes to a step S107.

In the step S107, the image processing condition producing section 4 obtains 5×5 ways of adjusting image processing condition produced by the adjusting image processing condition producing section 3 and the initial image processing condition determined by the initial image processing condition determination section 2. Addition of the basic parameter value set defining the initial image processing condition thus obtained and 5×5 ways of basic parameter value set defining the 5×5 ways of adjusting image processing condition thus obtained may produce 5×5 ways of image processing condition. Next, the process goes to a step S108.

In the step S108, the image processing section 9 obtains the 5×5 ways of image processing condition produced by the image processing condition producing section 4 and an image involved in information amount of the original image obtained by the original image obtaining section 1, and applies the image processing to the obtained image in accordance with the obtained 5×5 ways of image processing condition to produce 5×5 ways of preview image "a". Next, the process goes to a step S109.

In the step S109, the 5×5 ways of preview image "a" produced by the image processing section 9 are displayed, as shown in FIG. 7, on a two-dimensional basis on the image adjustment window of the display section 102a in the order of 5 parameters of the "brightness" associated with the images in the horizontal axis direction and in the order of 5 parameters of the "skin" associated with the preview images "a" in the vertical axis direction. That is, the 5×5 ways of preview image "a" shown in FIG. 7 are more light in the images at the more right side of the screen and are varied in the tone of a color of the skin in the images at the upper and lower portions of the screen.

The variation of the brightness and the variation of the tone of a color of the skin are sensuously natural for a general operator, as mentioned above, since the function parameters "brightness" and "skin" are defined suitably by the basic parameter value set. Next, the process goes to a step S110.

In the step S110, the image processing condition determination section 5 determines one image processing condition in accordance with an operation of an operator. Specifically, first, the operator operates the mouse to click a desired one of the 5×5 ways of preview images "a", so that the clicked image is selected by the image selection section 12. The outline of the selected image is displayed with the thick frame to indicate that the image is selected. The image processing condition on which the image thus selected is subjected to the image processing by the image processing section 9, and a deviation of the image processing condition from the initial image processing condition computed in accordance with only information of the original image, are stored in the image processing condition storage section 120_1, and then transferred to the image processing condition setting section 6. The deviation of the image processing condition from the initial image processing condition computed in accordance with only information of the original image is referred to as a deviation of image processing condition. Next, the process goes to a step S111.

In the step S111, in the event that the image determined by the image processing condition determination section 5 from among the 5×5 ways of preview images "a" is a desired image, the image processing condition setting section 6 designates the image thus determined as an image for set up of the image processing condition upon receipt of an instruction of set up by the setting instruction section 7 in accordance with depression of the decision button "b" by the operator. Then the image processing condition setting section 6 sets up the image processing condition, which is used when the image thus designated is subjected to the image processing by the image processing section 9, as the image processing condition for the image processing apparatus.

At the right side and the lower portion of the 5×5 ways of preview images "a" on the image adjustment window, there exist scroll bars "e", respectively. In the event that an operator cannot find a desired image from among the 5×5 ways of preview images "a", the operator operates the scroll bars "e" so as to display the preview images "a" subjected to the image processing on the image processing condition designated by the parameter values out of the range of −2 to 2 of the "brightness" and the "skin". In this case, the processes from the steps S106 to S110 are again executed on the parameter values over the range according to the operation of the scroll bars "e".

In the event that although an operator operates the scroll bars "e", the operator cannot find a desired image from among the preview images "a", the operator again operates the pop-up menus "b" so as to change the function parameters from the "brightness" and the "skin" to other sort of ones. In this case, the processes from the steps S105 to S110 are again executed in accordance with the function parameters newly selected by the operation of the pop-up menus "b".

When the function parameters are again selected, it is possible that an operator depresses the cancel button "c" to initialize the selection of the image, or alternatively it is possible that the operator adjusts the image based on the selected image as it is.

In the event that an image adjustment is performed in accordance with the selected image as it is, the initial image processing condition determination section 2 reads in accordance with the operation of the pop-up menus from the image processing condition storage section 120_1 the image processing condition associated with the image selected by the image selection section 12, and determines the image processing condition thus read as the initial image processing condition. Hereinafter, the adjustment for the new initial image processing condition is performed in a similar fashion to that of the steps S105 to S110.

According to the image processing condition setting apparatus of the present embodiment, it is possible to select the function parameter from among the above-mentioned function parameter groups by the operation of the pop-up menus in the manner as mentioned above. Thus, in case of the adjustment of the image processing condition, a plurality of preview images "a", which are varied in accordance with the variation of the parameter values of the selected various sorts of function parameters, are displayed on the screen adjustment window, and thus it is possible to scrutinize the image processing conditions comparatively in the various aspects.

Further, according to the image processing condition setting apparatus of the present embodiment, as mentioned above, a plurality of preview images "a", which are sensuously natural for the general operator and are representative of a variation good in quality, are displayed on the image adjustment window. This feature makes it possible that the general operator easily finds a desired image from among the preview images "a", and easily performs a set up of a desired image processing condition.

Furthermore, according to the image processing condition setting apparatus of the present embodiment, a plurality of preview images "a", which vary in accordance with a variation of the parameter values of two sorts of function parameters, are displayed on a two-dimensional basis. Ideally, it is preferable that all of the plurality of preview images "a", which vary in accordance with a variation of the parameter values of more function parameters, are displayed. However, realistically, such a display is impossible. A display on a two-dimensional basis brings about more ideal display as compared with a case where a plurality of preview images "a", which vary in accordance with a variation of the parameter values of one function parameter, are displayed on a one-dimensional basis, so that various images are displayed in form of the preview images "a" as a comparative object, and thus it is possible to easily performs a set up of the image processing condition.

Next, the process goes to a step S112.

In the S112, the image processing condition set up for the image processing apparatus 100_2 by the image processing condition setting section 6 is fed to the image processing condition output section 8, and then outputted from the image processing condition output section 8 to the image processing apparatus 100_2 in accordance with the depression of the "decision" button shown in FIG. 6. Here, a set up of the image processing condition for the image processing apparatus 100_2 by the visual set up is completed.

In the stage of the step S110, when the registration button "f" on the image adjustment window is depressed before the set up of the image processing condition, a registration dialog appears so that registration of a deviation of the image processing condition is performed by the operation of the registration dialog.

Figure 10:
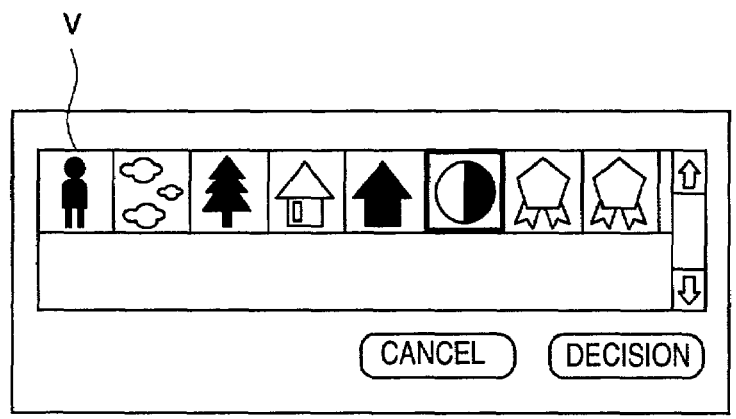
FIG. 10 is an illustration showing a registration dialog.

FIG. 10 is an illustration showing a registration dialog.

On the registration dialog shown in FIG. 10, there are displayed a plurality of icons which are the same as the plurality of icons "v" shown in the visual set up dialog of FIG. 7. Further, on the dialog shown in FIG. 10, there are displayed a cancel button and a decision button.

To register the image processing condition determined in the step S110 in the item of the "person" represented by one of the above-mentioned icons, it is effective that an operator operates the dialog in such a manner that only the icon of the "person" of the plurality of icons "v" is selected, and then depresses the decision button. Thus, the deviation of the image processing condition associated with the image selected in the image adjustment window is registered for the item of the "person".

The icon which is not now operative implies a non-registered icon. When an operator selects such a non-registered icon and depresses the decision button, it is possible to register the deviation of the image processing condition for the new item.

While the explanation is omitted in the step S102, actually, the initial image processing condition is provided as one in which the deviation registered in the registration dialog is added to the image processing condition computed through analyzing the original image only. This initial image processing condition is involved in the result of the adjustment performed by an operator in the past. On the 5×5 of preview image "a" of the image adjustment window appearing in the step S110, there is displayed an image which is subjected to the image processing by the image processing condition involved in the result of the adjustment performed in the past. Thus, the registration of the deviation of the image processing condition makes it easy to perform a new adjustment for the image processing condition, since the past adjustment result is effectively utilized.

Further, with respect to the image processing, generally, in many cases, suitable image processing conditions are mutually different for contents of images such as a person, the sky and a green, but image processing conditions for images of the same contents are similar to one another. According to the image processing condition setting apparatus 100_1 of the present embodiment, image processing conditions, which are mutually different, may be freely registered in accordance a state of the selection of the icon. Thus, it is possible to obtain the initial image processing condition according to the content of the original image as an object of the image processing, and thereby making it easy to perform an adjustment of the image processing condition.

Incidentally, as shown in the visual set up dialog of FIG. 7, there is a case where two sorts of icons take simultaneously a state of selection. In this case, a new deviation, in which the deviations registered in association with those two sorts of icons are added to each other, is provided as a deviation included in the initial image processing condition.

Figure 11:
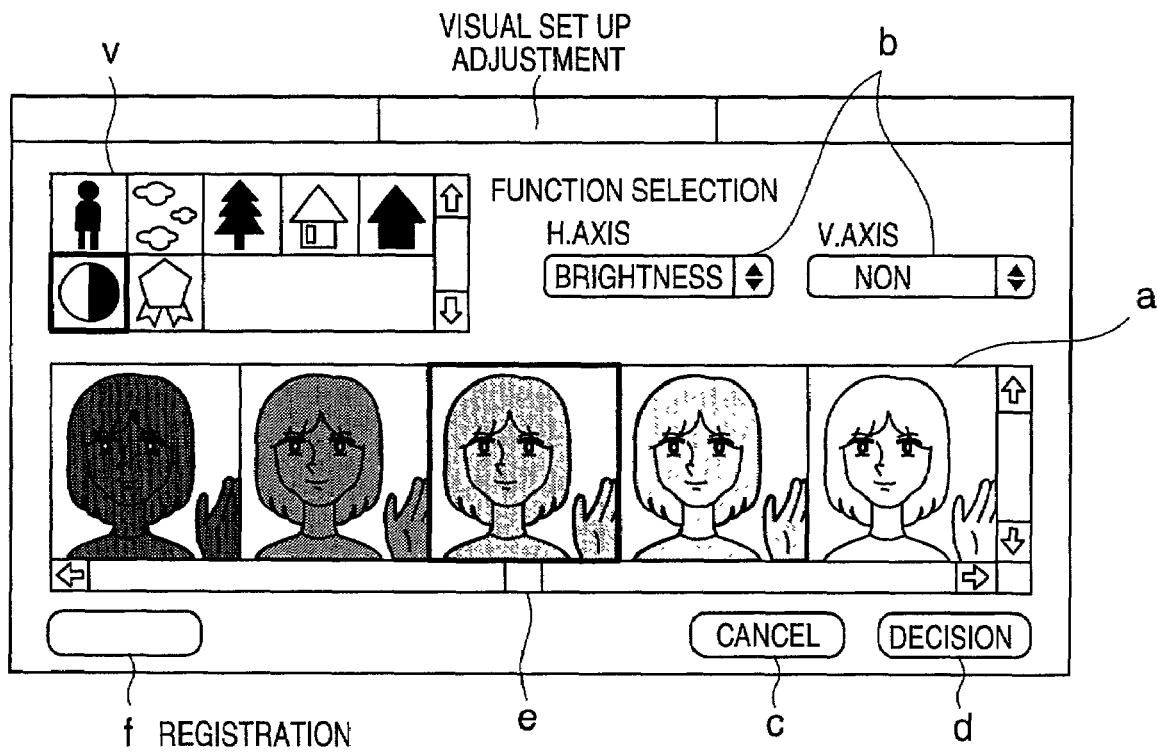
FIG. 11 is an illustration showing a screen of an adjustment window for a visual set up.

Incidentally, in the event that in the step S105, "non" which implies that the function parameter is not selected, is selected, for example, in the event that it is selected that the horizontal axis is concerned with the "brightness", while the vertical axis is concerned with the "non", they are displayed on the image adjustment window as shown in FIG. 11.

FIG. 11 is an illustration showing a screen of an adjustment window for a visual set up.

FIG. 11 shows a state of an image adjustment window wherein on the image adjustment window shown in FIG. 9 the "non" is selected by the pop-up menu "b" for selecting the function parameter of the horizontal axis. In this case, five ways of preview images "a" are displayed on a one dimensional basis on the image adjustment window.

In this manner, in the event that the function parameter is selected in only one of the two pop-up menus "b", there is no need to perform an addition between the basic parameter value sets associated with the two sorts of function parameters. Thus the process goes to steps S107 to S111 skipping the step S106. In the steps S107 to S111, in a similar fashion to a case where as the function parameters, the "brightness" and the "skin" are selected: the parameter selection section 10 selects one sort of function parameter "brightness"; the image processing condition producing section 4 produces five ways of image processing conditions associated with five ways of parameter values of the function parameter "brightness"; the image processing section 9 produces five ways of preview images "a" in which the original image obtained by the original image obtaining section 1 is subjected to the image processing by the five ways of image processing conditions associated with the five ways of parameter values produced by the image processing condition producing section 4; and the display section 102a displays the five ways of preview images "a" produced by the image processing section 9 in the order of the five ways of parameter values associated with the preview images "a".

In this manner, also in the event that the preview images "a" are displayed on a one dimensional basis, in a similar fashion to a case where they are displayed on a two-dimensional basis as mentioned above, it is possible to select various function parameters when the adjustment of the image processing conditions is performed, and thus, it is possible to scrutinize the image processing conditions comparatively in the various aspects. Further, it is possible to obtain review images "a", which are sensuously natural for the general operator and are representative of a variation good in quality, and whereby the general operator can easily perform a set up of a desired image processing condition.

Function Set Up

Figure 12:
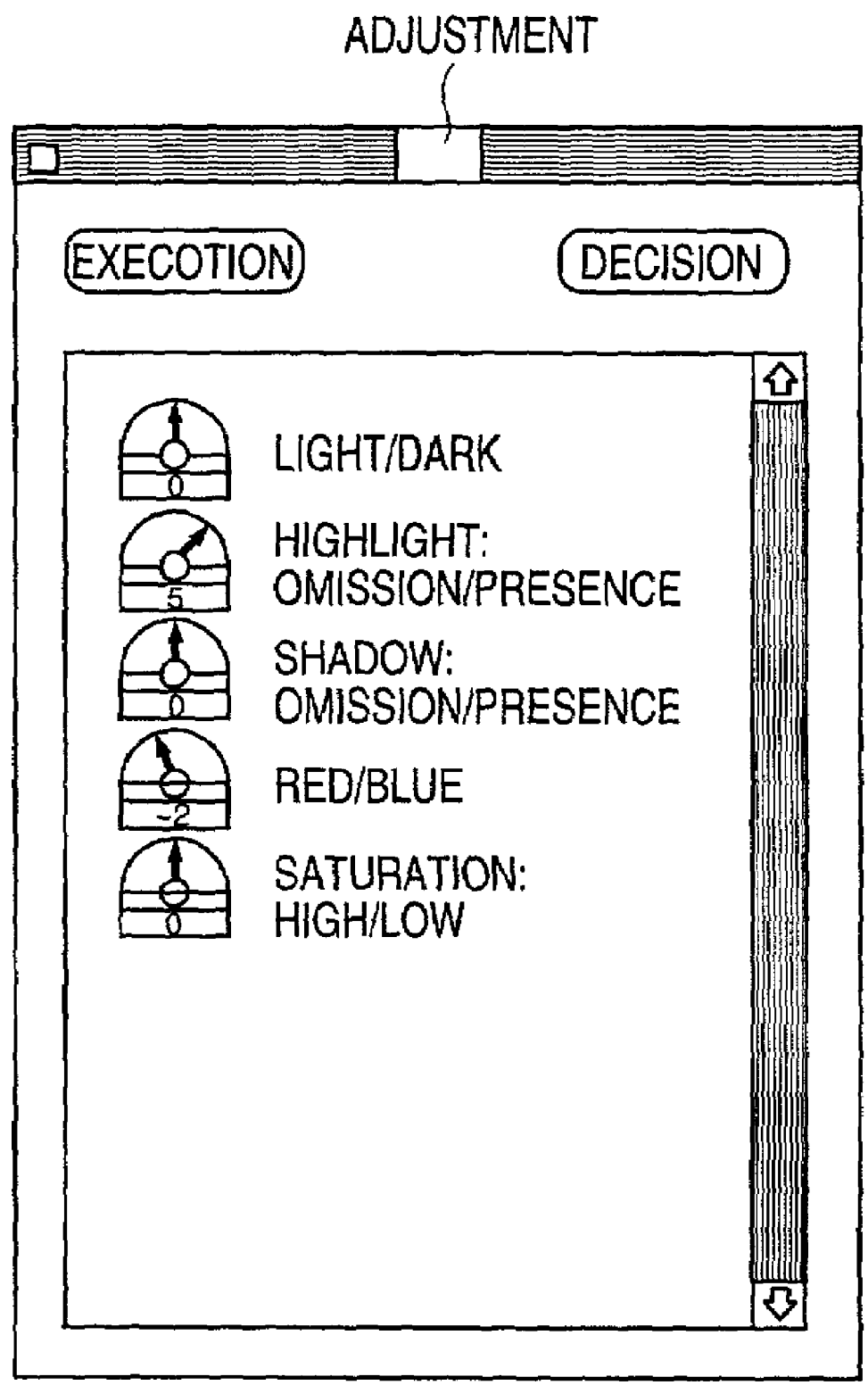
FIG. 12 is an illustration showing a screen of an adjustment window for a function set up.

In the event that the "function set up" is selected in the set up selection screen shown in FIG. 6, an adjustment window for a function set up shown in FIG. 12 appears.

FIG. 12 is an illustration showing a screen of an adjustment window for a function set up.

An operator can adjust the image processing conditions defining contents of the image processing for the image displayed on the image display window using the adjustment window shown in FIG. 12. On the adjustment window shown in FIG. 12, there are displayed five figure grips. Those finger grips are for "light/dark", "highlight: omission/presence", "shadow: omission/presence", "red/blue", and "saturation: high/low", in the order from the top. Adjustment is performed in accordance with the operation of those finger grips with respect to a direction of the image processing represented by the function parameters. The position and the numerical value of the arrow of each finger grip indicates the parameter value of the function parameter to be adjusted by the associated finger grip.

Of those function parameters, the function parameter representative of the adjustment "light/dark" is the same as the above-mentioned function parameter "brightness", and a table representative of the association between the parameter values and the basic parameter sets, of this function parameter, is the same as the Table 1. A table representative of the association between the parameter values and the basic parameter sets, of the function parameter representative of the adjustment "shadow: omission/presence", is expressed by Table 2 set forth below.

TABLE 2

| Parameter Value | SHD set up density C, M, Y |
|---|---|
| −3 | −0.5, −0.5, −0.5 |
| −2 | −0.3, −0.3, −0.3 |
| −1 | −0.1, −0.1, −0.1 |
| 0 | 0, 0, 0 |
| 1 | 0.2, 0.2, 0.2 |
| 2 | 0.4, 0.4, 0.4 |
| 3 | 0.7, 0.7, 0.7 |

As shown in table 2, the parameter values of the function parameter representative of the adjustment "shadow: omission/presence" are defined by the basic parameter value sets consisting of set up density associated with the shadow points in the shadow curves of CMY colors.

In this manner, also in this function set up, the suitably defined function parameter is used as a parameter for adjustment of the image processing condition. A variation of the parameter represented by a variation of the position of the finger grip involves an image variation which is sensuously natural close to impressions from the name of the parameter.

Further, on the top of the adjustment window, an execution button exists.

Next, there will be explained operations of the image processing condition setting apparatus 100_1 at the time of the function set up, referring to a flowchart of FIG. 13, and in addition FIG. 12 and Table 2 as well.

Figure 13:
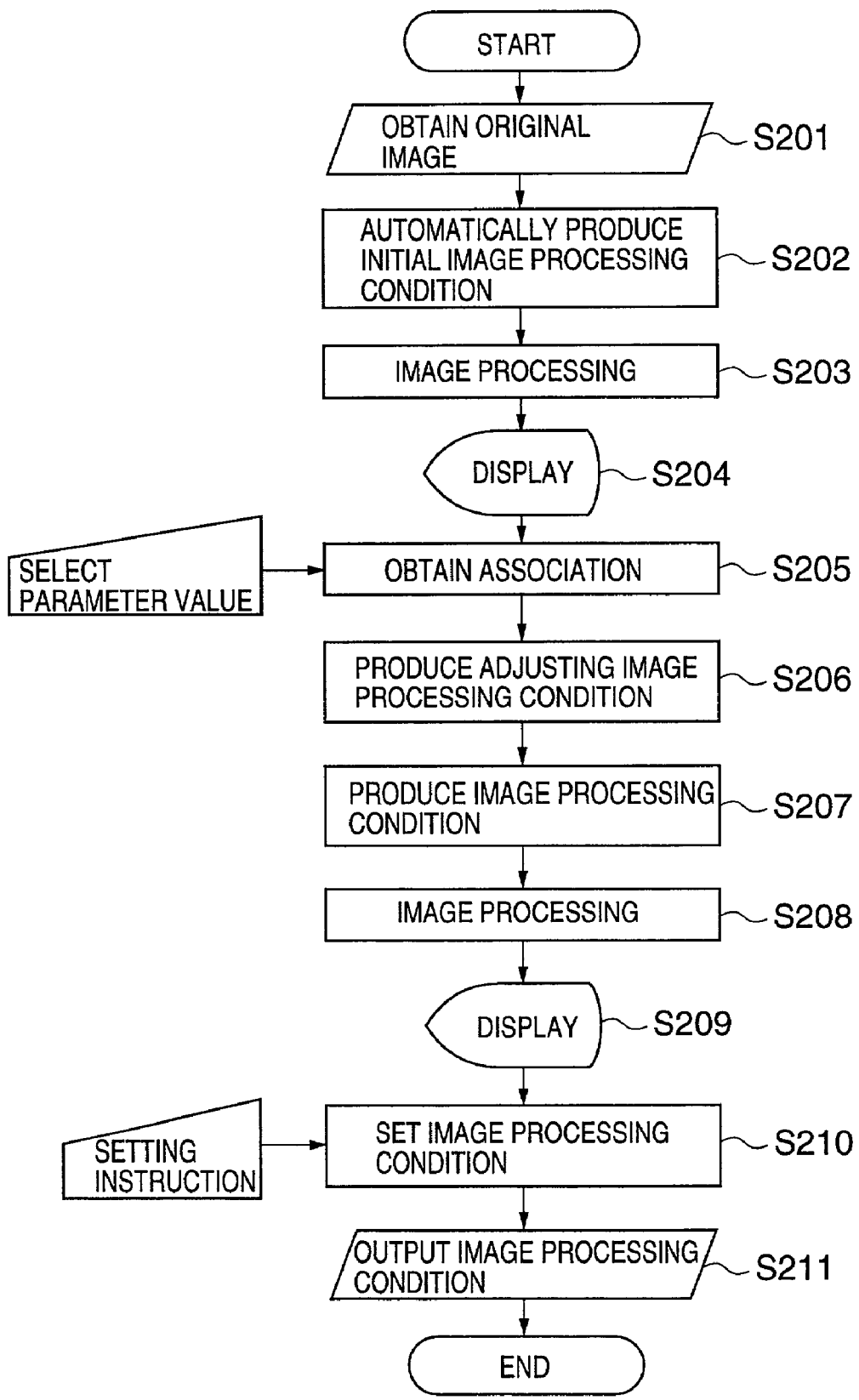
FIG. 13 is a flowchart useful for understanding an operation of the image processing condition setting apparatus according to the present embodiment at the time of a function set up.

FIG. 13 is a flowchart useful for understanding an operation of the image processing condition setting apparatus according to the present embodiment at the time of a function set up.

When the execution button on the adjustment window is depressed, the process of the flowchart starts.

In steps S201 to S204, in a similar fashion to that of the steps S101 to S104 in case of the visual set up, the original is obtained, the initial image processing condition is produced, and an image, wherein the original image is subjected to the image processing in accordance with the initial image processing condition, is displayed on the image display window. Next, the process goes to steps S205 to S206.

In the steps S205 to S206, first, the parameter value selection section 11 selects parameter values of the function parameters in accordance with the operation of the finger grips by an operator. The adjusting image processing condition producing section 53 produces the basic parameter value sets associated with the parameter values of the function parameters in accordance with the parameter values of the function parameters, referring to the association stored in the association storage section 120_2, and adds the basic parameter value sets thus produced one another, so that adjusting image processing conditions are produced. Next, the process goes to a step S207.

In the step S207, the image processing condition producing section 4 obtains the adjusting image processing condition produced by the adjusting image processing condition producing section 3 and the initial image processing condition determined by the initial image processing condition determination section 2, and produces the image processing condition by addition of the obtained initial image processing condition and the obtained adjusting image processing condition. Next, the process goes to steps S208 to S209.

In the steps S208 to S209, the image processing section 9 obtains the image processing condition produced by the image processing condition producing section 4 and the original image obtained by the original image obtaining section 1, so that the obtained image is subjected to the image processing in accordance with the obtained image processing condition. The image subjected to the image processing is displayed on the image display window on the display screen 102a.

In the event that the displayed image is not a favorite with the operator, the position of the finger grip is readjusted, and the steps S205 to S209 are repeated in accordance with the parameter position represented by the new position of the finger grip.

Next, the process goes to a step S210.

In the step S210, first, the image processing condition produced by the image processing condition producing section 4 is fed to the image processing condition determination section 5. The entered image processing condition is determined by the image processing condition determination section 5 as an operator's desired image processing condition in accordance with a depression of the decision button of the adjustment window shown in FIG. 12. The image processing condition thus determined and the deviation of the image processing condition are stored in the image processing condition storage section 120_1, and the parameter values of all the finger grips shown in the adjustment window are set to 0. The image processing condition stored in the image processing condition storage section 120_1 is transferred to the initial image processing condition determination section 2 and is used as a new initial image processing condition. The deviation stored in the image processing condition storage section 120_1 is used, in a similar fashion to that of the deviation registered in the visual set up, as a deviation for an adjustment for the initial image processing condition, included in the decision of the initial image processing condition at the time of the next function set up. Further, the image processing condition thus determined is transferred to the image processing condition setting section 6 so that the image processing condition is set up by the image processing condition setting section 6 as the image processing condition for the image processing apparatus 100_2 in accordance with the operation. Next, the process goes to a step S211.

In the step S211, in a similar fashion to that of the step S112 of the visual set up, the image processing condition set up by the image processing condition setting section 6 is outputted to the image processing apparatus 100_2. Here, set up of the image processing condition for the image processing apparatus 100_2 by the function set up is completed.

According to the image processing condition setting apparatus 100_1 of the present embodiment, the function set up is adopted in such a manner that a finger grip is simply operated to recognize a desired deviation so as to determine the image processing condition. Thus, an operator can easily perform an adjustment of the image processing condition.

Assist Set Up

Finally, there will be described operations of elements of the image processing condition setting apparatus 100_1 at the time of the assist set up, referring to a flowchart of FIG. 14, and in addition FIGS. 15 and 16.

Figure 14:
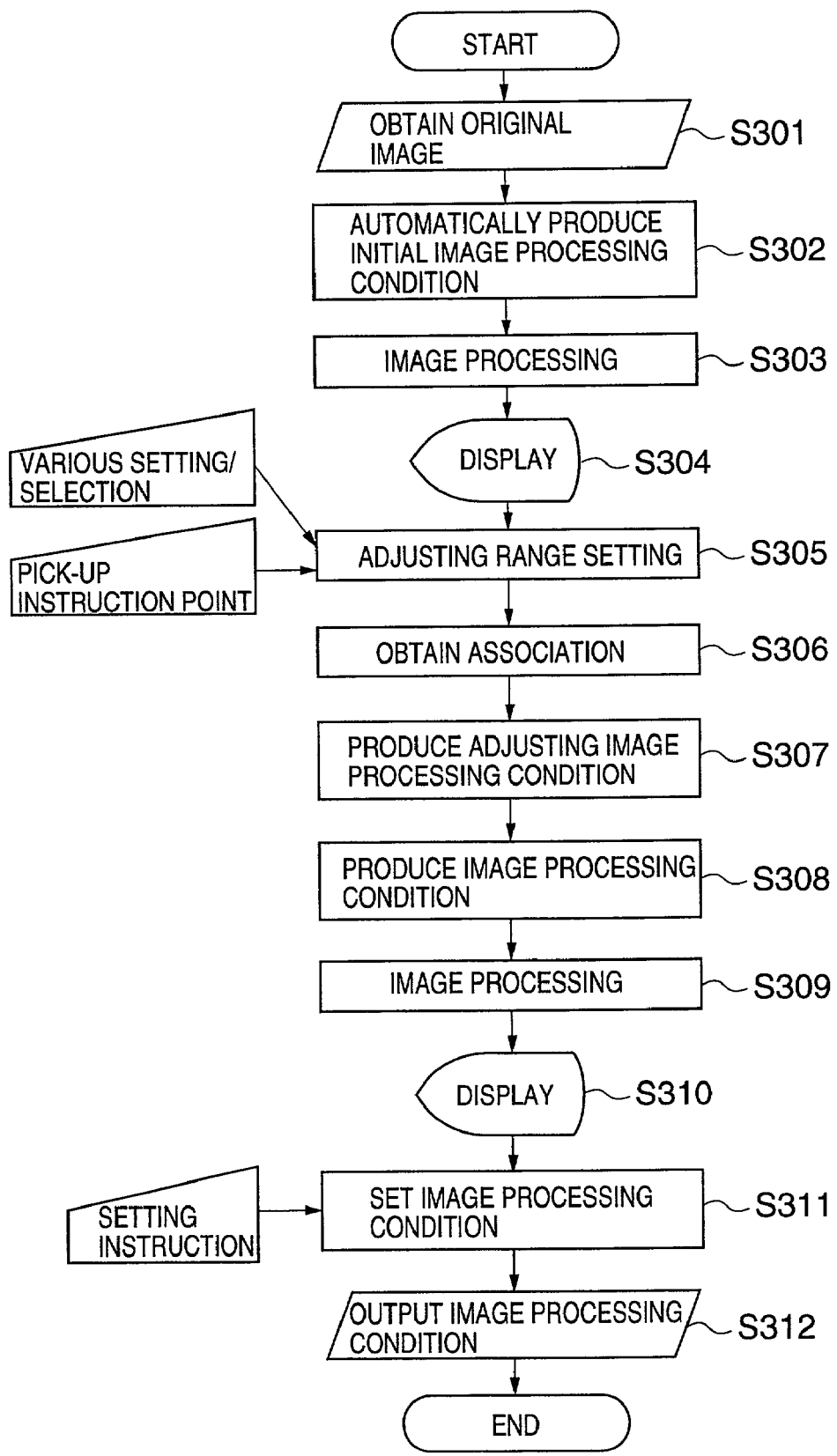
FIG. 14 is a flowchart useful for understanding an operation of the image processing condition setting apparatus according to the present embodiment at the time of an assist set up.

FIG. 14 is a flowchart useful for understanding an operation of the image processing condition setting apparatus according to the present embodiment at the time of an assist set up.

When the "assist set up" is selected on the set up selection screen shown in FIG. 6, the process of the flowchart starts.

In steps S301 to S304, in a similar fashion to that of the steps S101 to S104 in the visual set up, and the original image is obtained, the initial image processing condition is produced, so that the obtained image is subjected to the image processing in accordance with the obtained image processing condition. The image subjected to the image processing is displayed on the image display window. Next, the process goes to a step S305. Before the explanation of the step S305 et seqq., there will be explained the adjustment window of the assist set up.

Figure 15:
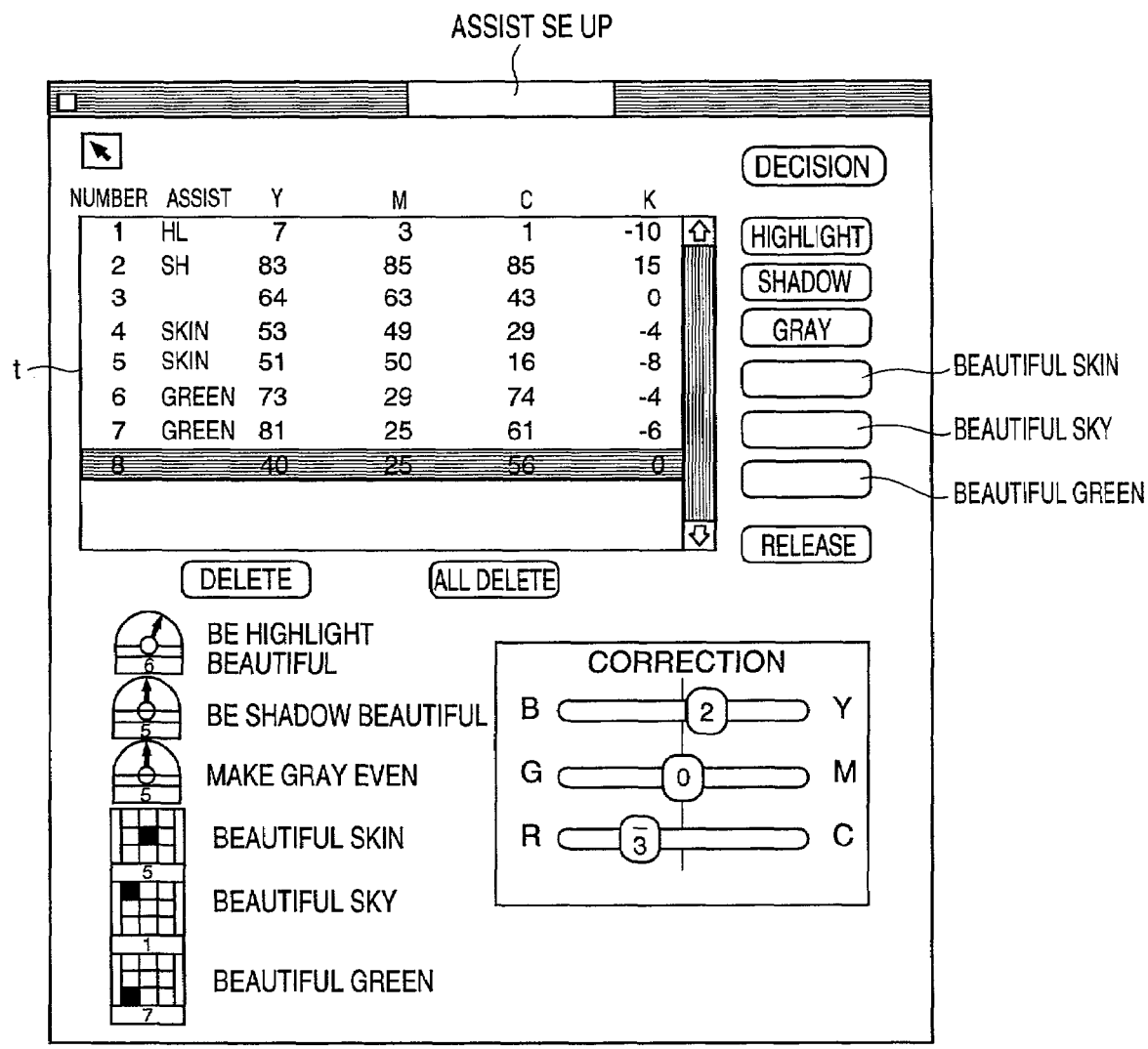
FIG. 15 is an illustration showing a screen of an adjustment window for an assist set up.

In the event that the "assist set up" is selected on the set up selection screen shown in FIG. 6, the adjustment window of the "assist set up" shown in FIG. 15 appears.

FIG. 15 is an illustration showing a screen of an adjustment window for an assist set up.

An operator can adjust the image processing condition for an image displayed on the image display window using the adjustment window shown in FIG. 15. An operator selects indication points indicating at least one location of an image displayed on the image display window. Color information in microscopic area having the range from about 1 to 10 picture elements around each selected indication point is obtained by the indication point pick up section 13.

The color information of the indication points thus obtained is displayed on a table "t" appearing at the upper left of the adjustment window. On the most left column of the table "t", numbers 1 to 8 are displayed. Those numbers denote identification number of the indication points. On the associated stages of those numbers of the table, there are provided one column for displaying items (assist items) such as "HL", "SH", "skin" and "green" representative of directions of the image processing for the indication points of those numbers of the table, and four columns for indicating intensity of colors of Y, M, C, K in the indication points of those numbers of the table.

In the right side of the table "t", there are provided buttons of "highlight", "shadow", "gray", "beautiful sky", "beautiful green". The assist items of the indication points may be selected by the parameter selection section 10, when any of those buttons is depressed, in accordance with a sort of the depressed button. Further, below those buttons, there is provide a "release" button. When the "release" button is depressed, a set up of the assist item is released. Furthermore, at the bottom of the table "t", there are provided "delete" button and "all delete" button. When those buttons are depressed, data of the indication points is deleted.

On this adjustment window, there are displayed three finger grids and three buttons at the lower left. Three finger grids are for adjusting the parameter values of the function parameters "be highlight beautiful", "be shadow beautiful", and "make gray even" in order from the top. In accordance with the operation of those finger grids, an adjustment is performed with respect to directions on the image processing represented by the function parameters. The position and the numerical value of the arrow of each finger grip indicates the parameter value of the function parameter to be adjusted by the associated finger grip. The parameter value is divided up into 0 to 10. In case of the value 0, the state represented by the intensity of YMCK colors of the indication points is not changed at all. In case of the value 10, the state of the indication point is changed to a state that one is determined, here, a state that the density of YMC colors is made even. States of the middles between the values 0 and 10 represent states between those two states. Thus, there is a need to suitably compute, in accordance with the state of the indication points, a range of the parameter values of the function parameters to be adjusted by those finger grids and a dividing up of the values within the range.

The three buttons are for adjusting the parameter values of the parameters "beautiful skin", "beautiful sky", and "beautiful green" in order from the top. Of those buttons, for example, when the button of "beautiful green" is depressed, an image determination window shown in FIG. 16 appears.

Figure 16:
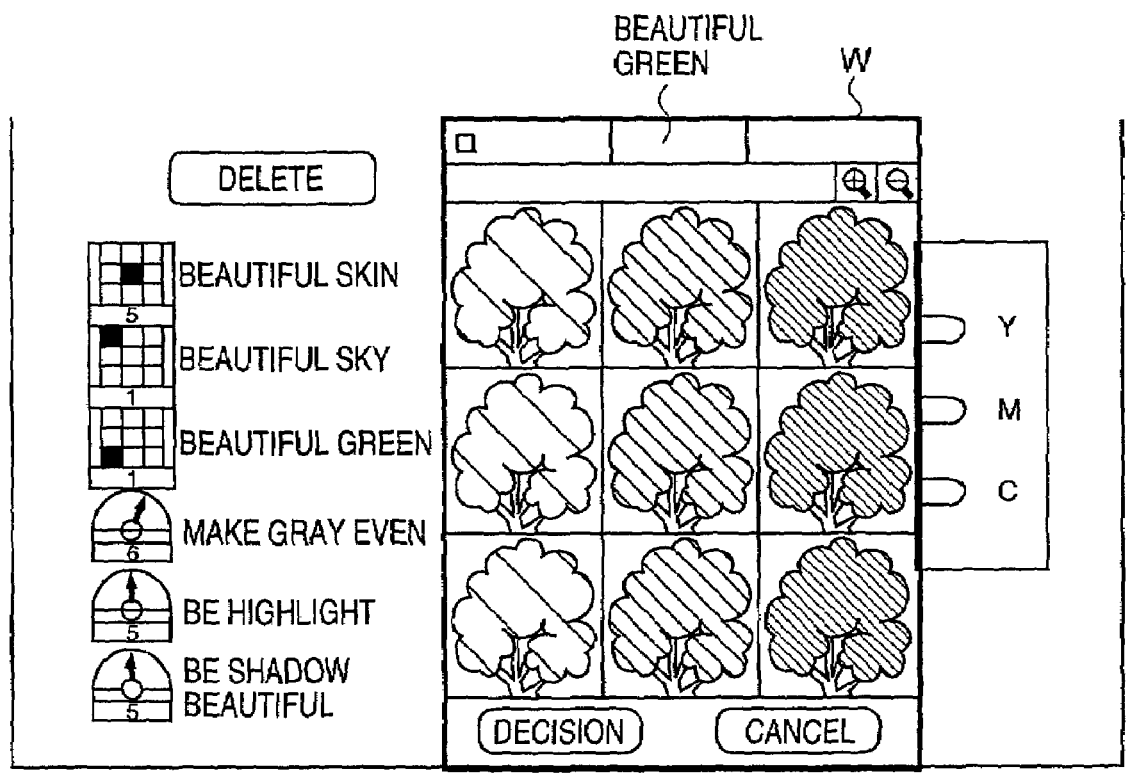
FIG. 16 is an illustration showing a screen of an image determination window for an assist set up.

FIG. 16 is an illustration showing a screen of an image determination window for an assist set up.

On an image determination window "w", there are displayed nine patterns of tree of images in which the original images are subjected to the image processing. Green colors of those trees are ones in which three ways of preferable colors of a green of young leaves, a green of usual leaves, and a green looking from a great distance, of greens of leaves are further divided into three ways of colors in accordance with luminous intensity. An operator can select a desired green color by clicking an image of a desired tree through operating the mouse. The operator reverses the stage representative of the indication point to be the conversion object of the table "t", and then depresses the "decision button" provided on the image determination window, so that a color of the indication point is converted into the green selected from the greens of the nine patterns of tree. The value of intensity of YMCK of the table "t" is also changed in accordance with the conversion.

On the adjustment window shown in FIG. 15, in the lower right, there are displayed three slide bars. It is possible to directly adjust intensity of YMC colors of the indication point through operating the three slide bars.

Now let us return the flowchart.

In the step S305, first, the adjusting range setting section 14 receives color information of the indication points derived by the indication point pick up section 13 and a sort (an assist item) of the function parameter selected by the parameter selection section 10 with respect to each indication point. Hereinafter, in this flowchart, there will be described a case where the entered assist items are "be highlight beautiful", "be shadow beautiful", and "make gray even". With respect to a case where the entered assist items are "beautiful skin", "beautiful sky", and "beautiful green", it will be described later.

In a case where the entered assist items are "be highlight beautiful", "be shadow beautiful", and "make gray even", the adjusting range setting section 14 sets up an adjusting range of parameter values of function parameters wherein a state of the entered indication points is given as the value 0 and a predetermined state according to a sort of the function parameter is given as the value 10. A difference between those two states is regarded as a sort of image processing condition. Next, the process goes to a step S306.

In the step S306, the parameter value producing section 15 produces parameter values of the function parameters 0 to 10 within the adjusted range set up by the adjusting range setting section 14 in association with basic parameter value sets each representative of a sort of image processing condition defined by a difference between the state associated with each parameter value and the state of the parameter value 0. Next, the process goes to steps S307 to S312.

The steps S307 to S312 are different from the steps S206 to S211 of the flowchart of the function set up simply in the point that the association to be referred to by the adjusting image processing condition producing section 3 is not the association stored in the association storage section 120_2, but is the association associated together with the generation of a plurality of parameter values of the function parameters by the parameter value producing section 15 between the parameter values and the basic parameter value sets associated the parameter values. In a similar fashion to that of the steps S206 to S211, in the steps S307 to S312, there are performed producing of the adjusting image processing condition, producing of the image processing condition, the image processing, a display of the image subjected to the image processing, decision and set up of the image processing condition, and outputting of the image processing condition to the image processing apparatus 100_2. Thus, the set up of the image processing condition by the assist set up is completed.

In the step S305, in the event that the assist items entered to the adjusting range setting section 14 are "beautiful skin", "beautiful sky", and "beautiful green", the set up of the adjusting range by the adjusting range setting section 14 is not performed in those assist items.

In step S306 subsequent to the step S305, the parameter value producing section 15 produces parameter values representative of nine images in those assist items in association with nine basic parameter value sets representative of a sort of image processing condition defining a difference between states of the nine images and states of the indication points involved in the set up of the assist item.

In the step S306 et seqq., they are different from the steps S106 to S112 of the flowchart of the visual set up simply in the point that the association to be referred to by the adjusting image processing condition producing section 3 is not the association stored in the association storage section 120_2, but is the association associated together with the generation of a plurality of parameter values of the function parameters by the parameter value producing section 15 between the parameter values and the basic parameter value sets associated the parameter values. In a similar fashion to that of the steps S106 to S112, in the step S306 et seqq., there are performed producing of the adjusting image processing condition, producing of the image processing condition, the image processing, a display of the image subjected to the image processing, decision and set up of the image processing condition by the screen selection, and outputting of the image processing condition to the image processing apparatus 100_2. Thus, the set up of the image processing condition by the assist set up is completed.

As shown in the table "t" of the adjustment window of the assist set up, in the event that a large number of indication points exist, an addition of basic parameter value sets each associated with the parameter value of the parameter representative of the assist item for each of the indication points may determines a deviation of the image processing condition for the image in its entirety, so that the image processing condition, wherein a large number of indication points exist, is determined in accordance with the deviation.

According to the image processing condition setting apparatus 100_1 of the present embodiment, it happens that of "visual set up", "function set up", and "assist set up", two or more sorts of set up are performed. In this case, the image processing condition having a deviation, in which deviations of the image processing conditions set by the respective sets up are added one another, is set up as the image processing condition for the image processing apparatus 100_2.

In this manner, according to image processing condition setting apparatus 100_1 of the present embodiment, the assist set up determines the image processing condition by recognition of a desired deviation relating to the microscopic area designated in accordance with the above-mentioned operation. Thus, an operator can easily set up the image processing condition in such a sense that a state of the microscopic area is altered to a desired state.

According to the image processing condition setting apparatus 100_1 of the present embodiment, an adoption of the above-mentioned sets up makes it possible that the image processing condition having a desired deviation from the initial image processing condition automatically produced on the basis of the original image is determined in accordance with an operation of an operator. Thus, it is effective for the operator to perform a deviation adjustment of the image processing condition from the initial image processing condition in accordance with an operation. This feature makes it possible to shortly set up the image processing condition bringing about a desired image processing.

As mentioned above, according to the present invention, it is possible to provide an image processing condition setting apparatus capable of simply setting up a desired image processing condition for a general operator, and an image processing condition setting program storage medium storing an image processing condition setting program which causes a computer system to operate as the image processing condition setting apparatus when the image processing condition setting program is executed by the computer system.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image processing condition setting apparatus for determining an image processing condition defining contents of an image processing to set up the image processing condition to an image processing apparatus for executing the image processing in accordance with the determined image processing condition, said image processing condition setting apparatus comprising:

an image obtaining section for obtaining an image according to an original image to be subjected to an image processing in said image processing apparatus;

an initial image processing condition determination section for determining an initial image processing condition in accordance with the image obtained by said image obtaining section;

an image processing condition determination section for determining in accordance with an operation an image processing condition having a desired deviation from the initial image processing condition determined by said initial image processing condition determination section; and an image processing condition setting section for setting up the image processing condition determined by said image processing condition determination section to said image processing apparatus.

2. An image processing condition setting apparatus according to claim 1, further comprising an association defining section defining an association between parameter values of a first parameter in which values applied to points on a predetermined path in a parameter space defined by a plurality of sorts of second parameters defining a deviation from the initial image processing condition, of the image processing condition, are given as parameter values, and combinations of parameter values of said plurality of sorts of second parameters corresponding to the points on the predetermined path, wherein said image processing condition determination section is designated by the parameter values of the first parameter in accordance with an operation, and determines, referring to the association defined by said association defining section, the image processing condition having the deviation consisting of the combinations of parameter values of said plurality of sorts of second parameters, associated with the designated parameter values.

3. An image processing condition setting apparatus according to claim 2, wherein said association defining section is a storage section for storing a table in which the association is described.

4. An image processing condition setting apparatus according to claim 2, wherein said association defining section is a storage section for storing a functional formula of parameter values of the second parameter wherein parameter values of the first parameter are given in form of argument.

5. An image processing condition setting apparatus according to claim 1, further comprising a first storage section for storing a deviation of the image processing condition determined by said image processing condition determination section from the initial image processing condition determined by said initial image processing condition determination section.

6. An image processing condition setting apparatus according to claim 2, further comprising a second storage section for storing parameter values of the second parameters representative of a deviation of the image processing condition determined by said image processing condition determination section from the initial image processing condition determined by said initial image processing condition determination section.

7. An image processing condition setting apparatus according to claim 1, further comprising a display section for displaying a handler for a deviation adjustment from the initial image processing condition determined by said initial image processing condition determination section,
wherein said image processing condition determination section recognizes a desired deviation upon receipt of an operation of the displayed handler and determines the image processing condition having a desired deviation from the initial image processing condition.

8. An image processing condition setting apparatus according to claim 1, wherein said image processing condition determination section produces a plurality of images by a plurality of image processings based on the image processing condition having deviations mutually different on the image processing conditions for the initial image processing condition determined by said initial image processing condition, and determines the image processing condition of the desired image upon receipt of designation of a desired image of the plurality of images, in accordance with an operation.

9. An image processing condition setting apparatus according to claim 2, wherein said association defining section defines the association on a plurality of sorts of second parameters for a plurality of paths mutually different in the parameter space,
said image processing condition setting apparatus further comprises a parameter selection section for selecting at a time a sort of second parameter from among the plurality of sorts of parameters in accordance with an operation, and
said image processing condition determination section produces a plurality of images subjected to an image processing based on the image processing condition for the parameter values of the second parameter selected by said parameter selection section, for the initial image processing condition determined by said initial image processing condition, and determines the image processing condition of the desired image upon receipt of designation of a desired image of the plurality of images, in accordance with an operation.

10. An image processing condition setting apparatus according to claim 2, wherein said association defining section defines the association on a plurality of sorts of second parameters for a plurality of paths mutually different in the parameter space,
said image processing condition setting apparatus further comprises a parameter selection section for selecting simultaneously two sorts of parameters from among the plurality of sorts of second parameters in accordance with an operation, and
said image processing condition determination section produces a plurality of images subjected to an image processing based on the image processing condition for sets of the parameter values of the two sorts of second parameters selected by said parameter selection section, for the initial image processing condition determined by said initial image processing condition, and determines the image processing condition of the desired image upon receipt of designation of a desired image of the plurality of images, in accordance with an operation.

11. An image processing condition setting apparatus according to claim 10, wherein said image processing condition setting apparatus further comprises a display section for displaying the plurality of images produced by said image processing condition determination section on a two-dimensional basis in accordance with the parameter values of the two sorts of second parameters.

12. An image processing condition setting apparatus according to claim 1, wherein said image processing condition setting apparatus further comprises:
an image processing section for performing an image processing for the image obtained by said image obtaining section in accordance with the initial image processing condition determined by said the initial image processing condition determination section;
a display section for displaying a handler for a deviation adjustment from the initial image processing condition determined by said initial image processing condition determination section and an image subjected to the image processing by said image processing section, and
an indication section for indicating a microscopic area on the image displayed on said display section in accordance an operation,
wherein said image processing condition determination section recognizes a desired deviation as to the microscopic area on the image indicated by said indication section in accordance with an operation of said handler and determines the image processing condition in which the desired deviation is reflected on the microscopic area.

13. An image processing condition setting apparatus according to claim 1,
wherein said initial image processing condition comprises at least one of an auto set up, a visual set up, a function set up, and an assist set up condition.

14. An image processing condition setting apparatus according to claim 1, wherein said initial image processing condition is automatically computed by the image processing condition setting apparatus in accordance with a result of an analysis for the obtained original image by a predetermined program and the image processing condition is determined by an algorithm of the program as an optimum for the original image.

15. An image processing condition setting apparatus according to claim 1,
wherein the image processing condition is fed to an image processing condition output section and then outputted from the image processing condition output section to the image processing apparatus.

16. An image processing condition setting apparatus according to claim 1, wherein the operation is performed by an operator of the image processing condition setting apparatus.

17. The image processing condition setting apparatus according to claim 8, wherein said plurality of images are produced at a predetermined time.

18. The image processing condition setting apparatus according to claim 8, wherein said plurality of images comprise the desired deviation from the initial image processing condition.

19. The image processing condition setting apparatus according to claim 8, wherein said plurality of images are available to an operator during the setting of the image processing condition.

20. An image processing condition setting program storage medium storing an image processing condition setting program, wherein when the image processing condition setting program is executed by a computer system, said computer system serves as an image processing condition setting apparatus for determining an image processing condition defining contents of an image processing to set up the image processing condition to an image processing apparatus for executing the image processing in accordance with the determined image processing condition, said image processing condition setting program comprising:
 an image obtaining section for obtaining an image according to an original image to be subjected to an image processing in said image processing apparatus;
 an initial image processing condition determination section for determining an initial image processing condition in accordance with the image obtained by said image obtaining section;
 an image processing condition determination section for determining in accordance with an operation an image processing condition having a desired deviation from the initial image processing condition determined by said initial image processing condition determination section; and
 an image processing condition setting section for setting up the image processing condition determined by said image processing condition determination section to said image processing apparatus.

21. An image processing condition setting program storage medium according to claim 20, wherein said initial image processing condition comprises at least one of an auto set up, a visual set up, a function set up, and an assist set up condition.

22. An image processing condition setting program storage medium according to claim 20, wherein said initial image processing condition is automatically computed by the image processing condition setting section in accordance with a result of an analysis for the obtained original image by a predetermined program and the image processing condition is determined by an algorithm of the program as an optimum for the original image.

23. An image processing condition setting program storage medium according to claim 20, wherein the image processing condition is fed to an image processing condition output section and then outputted from the image processing condition output section to the image processing apparatus.

24. An image processing condition setting program storage medium according to claim 20, wherein the operation is performed by an operator of the image processing condition setting apparatus.

25. An image processing condition setting apparatus for determining an image processing condition defining contents of an image processing to set up the image processing condition to an image processing apparatus for executing the image processing in accordance with the determined image processing condition, said image processing condition setting apparatus comprising:
 an image obtaining section for obtaining an image according to an original image to be subjected to an image processing in said image processing apparatus;
 an initial image processing condition determination section for determining an initial image processing condition in accordance with the image obtained by said image obtaining section; and
 an association defining section defining an association between parameter values of a first parameter in which values applied to points on a predetermined path in a parameter space defined by a plurality of sorts of second parameters defining a deviation from the initial image processing condition, of the image processing condition, are given as parameter values, and combinations of parameter values of said plurality of sorts of second parameters corresponding to the points on the predetermined path.

* * * * *